(12) United States Patent
Fujiwara et al.

(10) Patent No.: US 11,475,121 B2
(45) Date of Patent: Oct. 18, 2022

(54) CONFIDENTIAL INFORMATION PROCESSING SYSTEM AND CONFIDENTIAL INFORMATION PROCESSING METHOD

(71) Applicant: Hitachi, Ltd., Tokyo (JP)

(72) Inventors: Keisei Fujiwara, Tokyo (JP); Hisayoshi Sato, Tokyo (JP)

(73) Assignee: Hitachi, Ltd., Tokyo (JP)

(*) Notice: Subject to any disclaimer, the term of this patent is extended or adjusted under 35 U.S.C. 154(b) by 148 days.

(21) Appl. No.: 17/006,017

(22) Filed: Aug. 28, 2020

(65) Prior Publication Data

US 2021/0064741 A1 Mar. 4, 2021

(30) Foreign Application Priority Data

Aug. 30, 2019 (JP) .............................. JP2019-158347

(51) Int. Cl.
*G06F 21/53* (2013.01)
*G06F 21/60* (2013.01)
(Continued)

(52) U.S. Cl.
CPC ............ *G06F 21/53* (2013.01); *G06F 21/602* (2013.01); *G06F 21/6209* (2013.01); *G06F 21/71* (2013.01)

(58) Field of Classification Search
CPC .... G06F 21/53; G06F 21/602; G06F 21/6209; G06F 21/71
See application file for complete search history.

(56) References Cited

U.S. PATENT DOCUMENTS 5,864,673 A * 1/1999 Ohto ..................... H04L 69/24
709/236
9,225,691 B1 * 12/2015 Balasubramanian .......................
H04L 9/3239
(Continued)

FOREIGN PATENT DOCUMENTS

| EP | 2 650 798 A1 | 10/2013 |
| EP | 3 438 846 A1 | 2/2019 |
| JP | 2018-515836 A | 6/2018 |

OTHER PUBLICATIONS

Extended European Search Report issued in European Application No. 20193317.3 dated Dec. 15, 2020 (13 pages).

*Primary Examiner* — Ayoub Alata
(74) *Attorney, Agent, or Firm* — Crowell & Moring LLP

(57) ABSTRACT

In the confidential information processing server, when the processing query execution unit receives a processing request, the TEE trusted part processing unit generates a confidential extraction query for extracting data that matches with a condition of a processing target in the processing request by confidential extraction based on the processing request and an encryption key that can be used only in a TEE trusted part, the confidential extraction processing unit instructs execution of the confidential extraction query so as to extract encrypted data of the processing target while the data is kept encrypted from the encryption DB unit, the TEE trusted part processing unit decrypts the encrypted data of the processing target extracted by the confidential extraction processing unit with an encryption key, and executes data processing requested by the processing request, and the processing query execution unit returns an execution result of the data processing to a transmission source of the processing request.

8 Claims, 16 Drawing Sheets

(51) Int. Cl.
*G06F 21/62* (2013.01)
*G06F 21/71* (2013.01)

(56) References Cited

U.S. PATENT DOCUMENTS

| | | | |
|---|---|---|---|
| 2005/0147246 A1* | 7/2005 | Agrawal | H04L 9/0662 |
| | | | 380/44 |
| 2007/0239619 A1* | 10/2007 | Maruyama | G06Q 30/06 |
| | | | 705/59 |
| 2010/0129855 A1* | 5/2010 | Kataoka | G01N 33/5094 |
| | | | 435/287.1 |
| 2013/0262863 A1 | 10/2013 | Yoshino et al. | |
| 2013/0305046 A1* | 11/2013 | Mankovski | H04L 9/0894 |
| | | | 713/168 |
| 2014/0281511 A1* | 9/2014 | Kaushik | H04L 63/062 |
| | | | 713/164 |
| 2018/0063092 A1 | 3/2018 | Ollikainen et al. | |

* cited by examiner

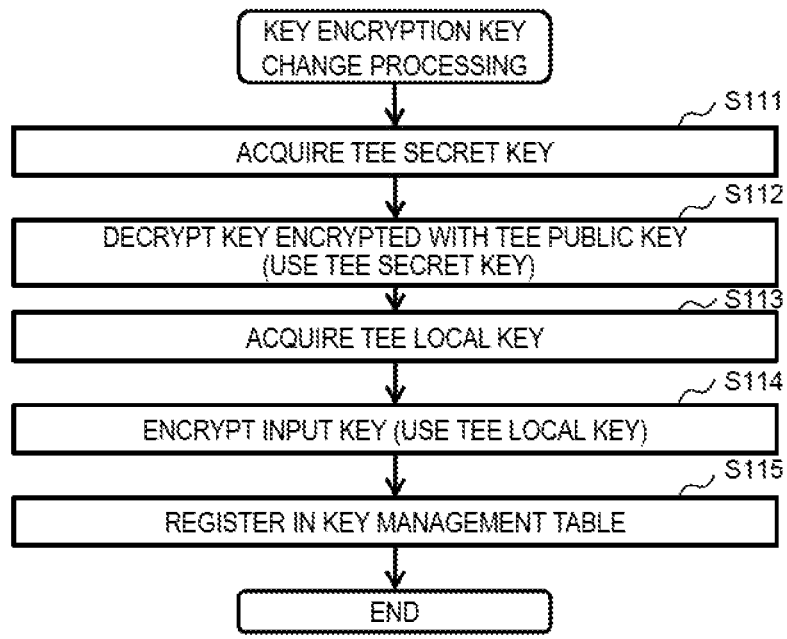

| NAME | ADDRESS | GENDER | AGE | HEIGHT | WEIGHT |
|---|---|---|---|---|---|
| HANAKO SUZUKI | TOKYO | FEMALE | 28 | 170.1 | 72.4 |
| TARO YOKOHAMA | KANAGAWA | MALE | 2 | 75.6 | 10.5 |
| JIRO TOTSUKA | OSAKA | MALE | 12 | 148.7 | 38.2 |
| ... | ... | ... | ... | ... | ... |
| ... | ... | ... | ... | ... | ... |
| ... | ... | ... | ... | ... | ... |
| SABURO HAKATA | FUKUOKA | MALE | 10 | 132.4 | 34.3 |

| NAME | ADDRESS | GENDER | AGE | HEIGHT | WEIGHT |
|---|---|---|---|---|---|
| b8b38n | zx6euk | 5u7x45 | es1hwv | pxlbty | zzt0nx |
| hyn276 | 3fnazv | q6ktbr | 85kz7k | 4ouk4l | egnest |
| hbe9t4 | 48b8pw | qqwryh | 7yrrco | oxt2rd | 0qmwm |
| ... | ... | ... | ... | ... | ... |
| ... | ... | ... | ... | ... | ... |
| ... | ... | ... | ... | ... | ... |
| ch2fsi | qxdcz3 | wsyh4a | uhl7l2 | 8n3bas | 0k05v0 |

1141

| | NAME | ADDRESS | GENDER | AGE | HEIGHT | WEIGHT |
|---|---|---|---|---|---|---|
| 3511 | h02ply | s6x7mn | mk8bej | 02qr12 | jfnd8w | t92cti |
| | qxtkug | wj0jek | 5tnz4j | i5ib0i | lvv0ye | 9hpbmz |
| | pgcqpq | fdgby2 | nxtbn3 | 3n59ch | pnk3rg | 8ew5wv |
| | ... | ... | ... | ... | ... | ... |
| | ... | ... | ... | ... | ... | ... |
| | ... | ... | ... | ... | ... | ... |
| | 42tkvn | 50x5d3 | 57ac0u | hk0bh5 | aquykc | ak89t6 |

DATA PROCESSING CONDITION INPUT ~410

- TARGET DATA: [PATIENT DATA TABLE] ~4101
  - NARROWING CONDITION 1: [GENDER] [MALE] ~4103

LOWER LIMIT VALUE / UPPER LIMIT VALUE
  - NARROWING CONDITION 2: [AGE] [0] ~ [15]

4104 / 4105 / 4106

- PROCESSING METHOD: [REGRESSION ANALYSIS] ~4107
  - REGRESSION MODEL [Y=aX+b] ~4108
    - EXPLANATORY VARIABLE X: [HEIGHT] ~4109
    - OBJECTIVE VARIABLE Y: [AGE] ~4110

4111 ~ [OK]  [CANCEL] ~4112

- TARGET DATA: ~2131
  - PATIENT DATA TABLE
    - NARROWING CONDITION 1: [GENDER] [MALE]

LOWER LIMIT VALUE / UPPER LIMIT VALUE
    - NARROWING CONDITION 2: [AGE] [0] ~ [15]

- PROCESSING METHOD: ~2132
  - REGRESSION ANALYSIS
    - REGRESSION MODEL [Y=aX+b]
      - EXPLANATORY VARIABLE X: [HEIGHT]
      - OBJECTIVE VARIABLE Y: [AGE]

| GENDER | AGE | HEIGHT |
|---|---|---|
| q6ktbr | 85kz7k | 4ouk4l |
| qqwryh | 7yrrco | oxt2rd |
| ... | ... | ... |
| ... | ... | ... |
| wsyh4a | uhl7l2 | 8n3bas |

DATAPROCESSING RESULT

- PROCESSING CONDITION:  
  3191  
  zhco9p4bxju8uroct7yd65npf7bomcv08bg7v42i40d zjohcwqchi5uoh55vv72l3lyslqioy1mflh35iti5ekmwd 4nifhpdv5pw

- PROCESSING RESULT  
  3192  
  i38ze3w08j6ktswob2iom6uxtfpooexd66kihs99dyn4 hjofcspq361l1sf6yn1k9wsftmin9nxqgnt90wryphv9a x7hakvq4uu6

DATAPROCESSING RESULT

4201  
PROCESSING CONDITION
- TARGET DATA: PATIENT DATA TABLE  
  (MALE, AGE AGE 0~15)

- PROCESSING CONTENT: REGRESSION ANALYSIS  
  (REGRESSION MODEL: Y=aX+b)
  - EXPLANATORY VARIABLE X: HEIGHT
  - OBJECTIVE VARIABLE Y: AGE

4202  
PROCESSING RESULT SUMMARY: REGRESSION ANALYSIS
  - COEFFICIENT a: 0.016
  - INTERCEPT b: -9.62
  - REGRESSION MODEL Y=aX+b: Y(AGE)= 0.016 × X(HEIGHT) - 9.62

OK  4203

420

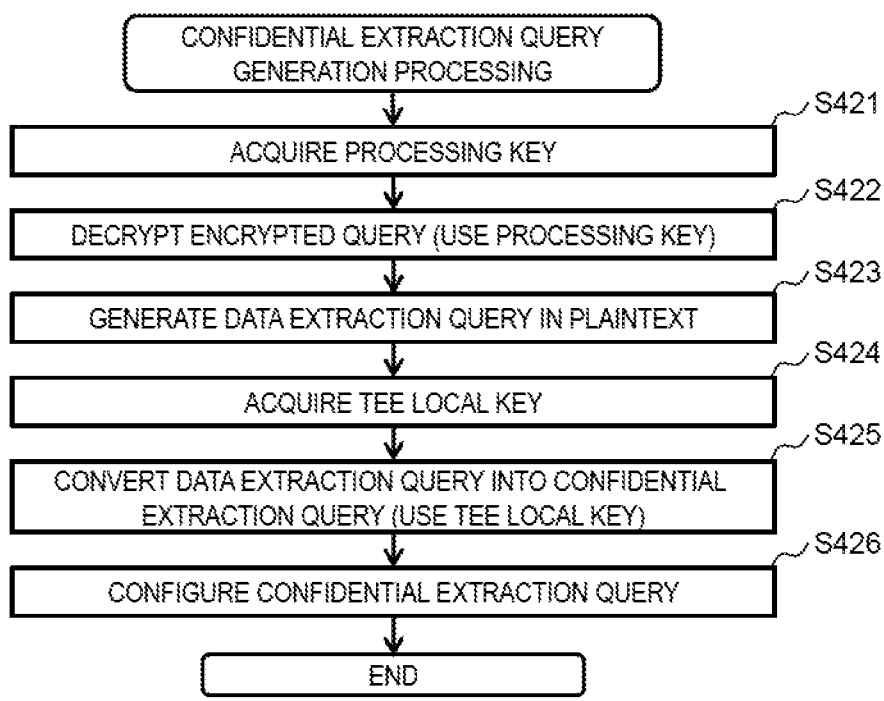

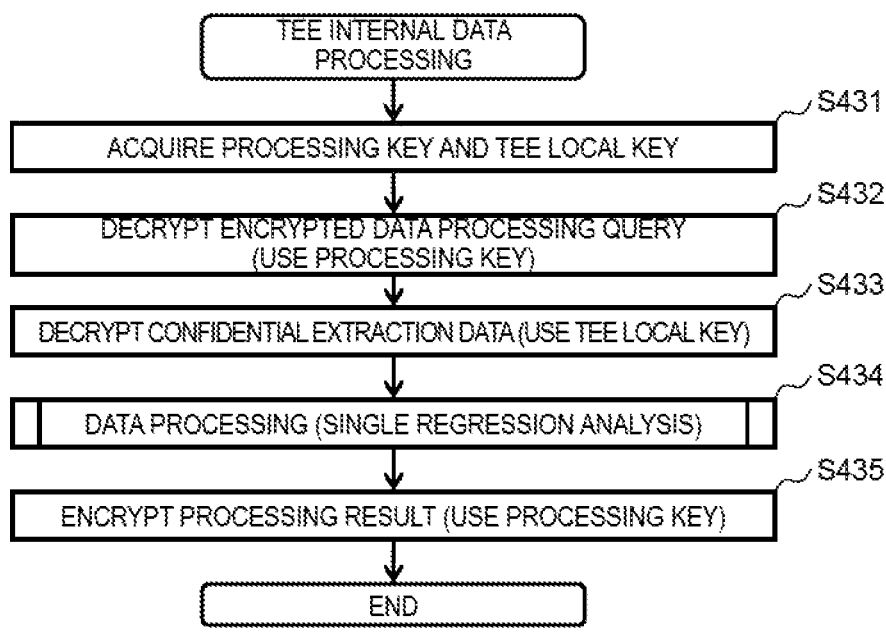

CONFIDENTIAL INFORMATION PROCESSING SYSTEM AND CONFIDENTIAL INFORMATION PROCESSING METHOD

INCORPORATION BY REFERENCE

This application claims priority based on Japanese patent application, No. 2019-158347 filed on Aug. 30,2019, the entire contents of which are incorporated herein by reference.

BACKGROUND

The present invention relates to a confidential information processing system and a confidential information processing method, and is suitably applied to a confidential information processing system and a confidential information processing method for processing and utilizing confidential information such as personal information while keeping the information confidential.

A personal data utilization scheme in which the public and private sectors cooperate has been progressing in such a manner that, in December 2016, the Basic Act on the Advancement of Public and Private Sector Data Utilization, which promotes the proper use of public and private sector data for individuals by various entities, was promulgated and enforced, and in December 2018, acceptance of applications for certification of an information bank was started. Furthermore, the Ministry of Internal Affairs and Communications has announced that the first certification of an information bank will be issued in March 2019.

Under such circumstances, creation of new value that associates various pieces of information has been promoted in such a manner as a public service in which public and private sectors such as an emergency service and a security company share information with each other, and association of private services such as a pharmaceutical, insurance, transportation, and an information bank that produce a synergistic effect with public services. In order to analyze various pieces of data and create new value, statistical analysis such as regression analysis and analysis processing such as machine learning are considered effective. Furthermore, realization of these services requires a confidential information processing technique that allows a provider of a public service and a private service to analyze and utilize confidential information such as personal information owned by data holders such as a hospital and an information bank while the privacy of individuals is protected.

In a conventional confidential information processing technique, concealing of confidential information such as personal information has been realized by allowing certain processing while data is encrypted. However, in the conventional confidential information processing technique, the executable processing is limited to basic operations such as search and order comparison, and the degree of freedom in processing is limited. Further, cryptographic techniques such as homomorphic encryption, which has no limitation in the degree of freedom in processing, cannot be realized at a practical processing speed. For this reason, a high level of statistical processing that requires a high degree of freedom in processing and confidential information processing compatible with machine learning have been issues.

Here, for example, JP 2018-515836 A can be cited as a system for processing that cannot be executed while information is encrypted. JP 2018-515836 A discloses a system that enables a cloud service to delegate processing of encrypted confidential data to a trusted user device.

SUMMARY

However, in the system disclosed in JP 2018-515836 A described above, a cloud service transmits encrypted confidential data to a user device for processing. Accordingly, there has been a problem that the processing time becomes long due to the overhead of data transmission. Further, in processing of analyzing various pieces of data in combination, there has been a problem that transmitting various pieces of data including data of other users to a specific user device for analysis is not appropriate from the viewpoint of processing power, concealment of confidential information, and privacy protection.

In recent years, a trusted execution environment (TEE) function is becoming standardly installed in a main central processing unit (CPU), and this TEE function is considered to be effective for processing confidential information. The TEE function is a function that provides, in a server on a cloud, a hardware trusted part in which information cannot be read even if the administrator authority of the server is taken over, and decrypts encrypted data only within the trusted part for processing. In this manner, advanced processing can be performed safely. However, when the TEE function is implemented, an amount of data that can be handled in the trusted part is limited to be smaller than an amount of memory in a server. Accordingly, there has been a problem that decrypting and processing all various pieces of data are difficult.

The present invention has been made in consideration of the above points, and an object of the present invention is to propose a confidential information processing system and a confidential information processing method capable of executing processing of analyzing by various pieces of data by statistical processing and machine learning by keeping confidential information such as personal information concealed while suppressing an increase in response time of a processing result for a user.

In order to achieve the above object, the present invention provides a confidential information processing system described below that performs data processing on encrypted data of data including confidential information provided to a confidential information processing server from a data holder terminal which owns the data. In this confidential information processing system, the confidential information processing server includes a processing request execution unit that receives a processing request for the encrypted data, a confidential extraction processing unit that instructs execution of confidential extraction for extracting data that matches with a predetermined condition while the encrypted data is kept encrypted, a trusted part processing unit that decrypts and processes the encrypted data using an encryption key that can be used only in a safe trusted part in the trusted part, and an encrypted data holding unit that stores the encrypted data encrypted with a confidentially extractable cipher with which the confidential extraction can be executed. When the processing request execution unit receives the processing request, the trusted part processing unit generates a confidential extraction query for performing extraction of data that matches with a condition of a processing target in the processing request by the confidential extraction based on the processing request and the encryption key, the confidential extraction processing unit extracts encrypted data of the processing target while the data is kept encrypted from the encrypted data holding unit by instructing execution of the generated confidential extraction query, the trusted part processing unit decrypts encrypted data of the processing target extracted by the confidential extraction processing unit with the encryption key, and executes data processing requested by the processing request, and the processing request execution unit returns an execution result of the data processing to a transmission source of the processing request.

Further, in order to achieve the above object, the present invention provides a confidential information processing method described below that performs data processing on encrypted data of data including confidential information provided to a confidential information processing server from a data holder terminal which owns the data. Here, the confidential information processing server has a processing request execution unit that receives a processing request for the encrypted data, a confidential extraction processing unit that instructs execution of confidential extraction for extracting data that matches with a predetermined condition while the encrypted data is kept encrypted, a trusted part processing unit that decrypts and processes the encrypted data using an encryption key that can be used only in a safe trusted part in the trusted part, and an encrypted data holding unit that stores the encrypted data encrypted with a confidentially extractable cipher with which the confidential extraction can be executed. Then, this confidential information processing method includes a processing request receiving step in which the processing request execution unit receives the processing request, a confidential extraction query generating step in which the trusted part processing unit generates a confidential extraction query for performing extraction of data that matches with a condition of a processing target in the processing request by the confidential extraction based on the processing request and the encryption key received in the processing request receiving step, a confidential data extracting step in which the confidential extraction processing unit extracts encrypted data of the processing target while the data is kept encrypted from the encrypted data holding unit by instructing execution of the confidential extraction query generated in the confidential extraction query generating step, a trusted part internal data processing step in which the trusted part processing unit decrypts encrypted data of the processing target extracted in the confidential data extracting step with the encryption key, and executes data processing requested by the processing request, and a processing request responding step in which the processing request execution unit returns an execution result of the trusted part internal data processing step to a transmission source of the processing request.

According to the present invention, processing of analyzing various pieces of data by statistical analysis or machine learning while confidential information such as personal information is kept confidential, and further response time of a processing result to the user can be shortened.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 10 is a flowchart showing a processing process of key encryption key change processing;

FIG. 11 is an example of a key management table;

FIG. 14 is an example of data used in the data registration processing;

FIG. 15 is an example of encrypted data registered on a data holder terminal side in the data registration processing;

FIG. 19 is an example of a processing query generation screen;

FIG. 20 is an example of a processing query;

FIG. 25 is an example of an encrypted processing result obtained by TEE internal data processing;

FIG. 26 is an example of a processing result display screen;

FIG. 27 is a flowchart showing a processing process of confidential extraction query generation processing;

FIG. 28 is an example of a data extraction query;

FIG. 29 is a flowchart showing a processing process of the TEE internal data processing;

FIG. 30 is an example of extracted data obtained by decrypting confidential extracted data.

DESCRIPTION OF THE EMBODIMENTS

Hereinafter, an embodiment of the present invention will be described in detail with reference to the drawings.

(1) Configuration of Confidential Information Processing System

Figure 1:
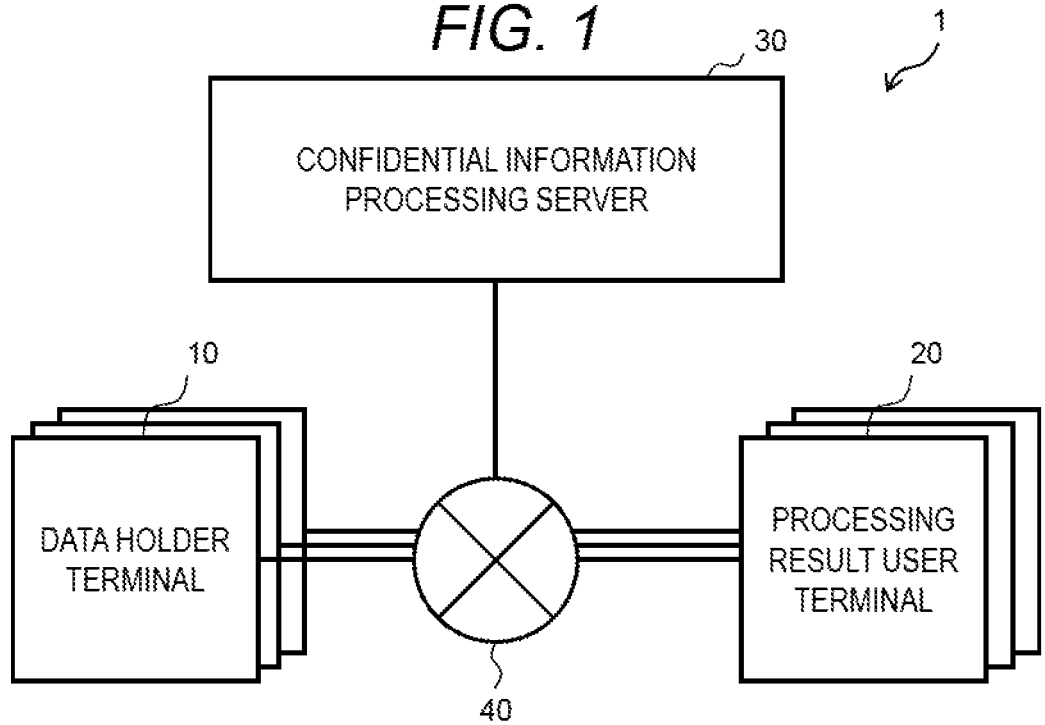
FIG. 1 is a block diagram showing a system configuration example of a confidential information processing system according to an embodiment of the present invention.

FIG. 1 is a block diagram showing a system configuration example of a confidential information processing system according to an embodiment of the present invention.

A confidential information processing system 1 according to the present embodiment is a system to which encrypted data is deposited from a data holder that holds confidential information such as personal information. The system processes the data in response to a processing request from a processing result user while keeping the data confidential, and provides a processing result to the processing result user.

As shown in FIG. 1, the confidential information processing system 1 includes a data holder terminal 10 that is used by a data holder to encrypt and deposit data, a processing result user terminal 20 with which a processing result user generates and transmits a processing request and refers to a processing result, a confidential information processing server 30 that executes processing of a processing request received from a processing result user for data deposited from a data holder while keeping the data confidential and transmits a processing result, and a network 40 that connects them. Note that, as shown in FIG. 1, in the confidential information processing system 1 according to this embodiment, a plurality of the data holder terminals 10 and a plurality of the processing result user terminals 20 can be connected.

Figure 2:
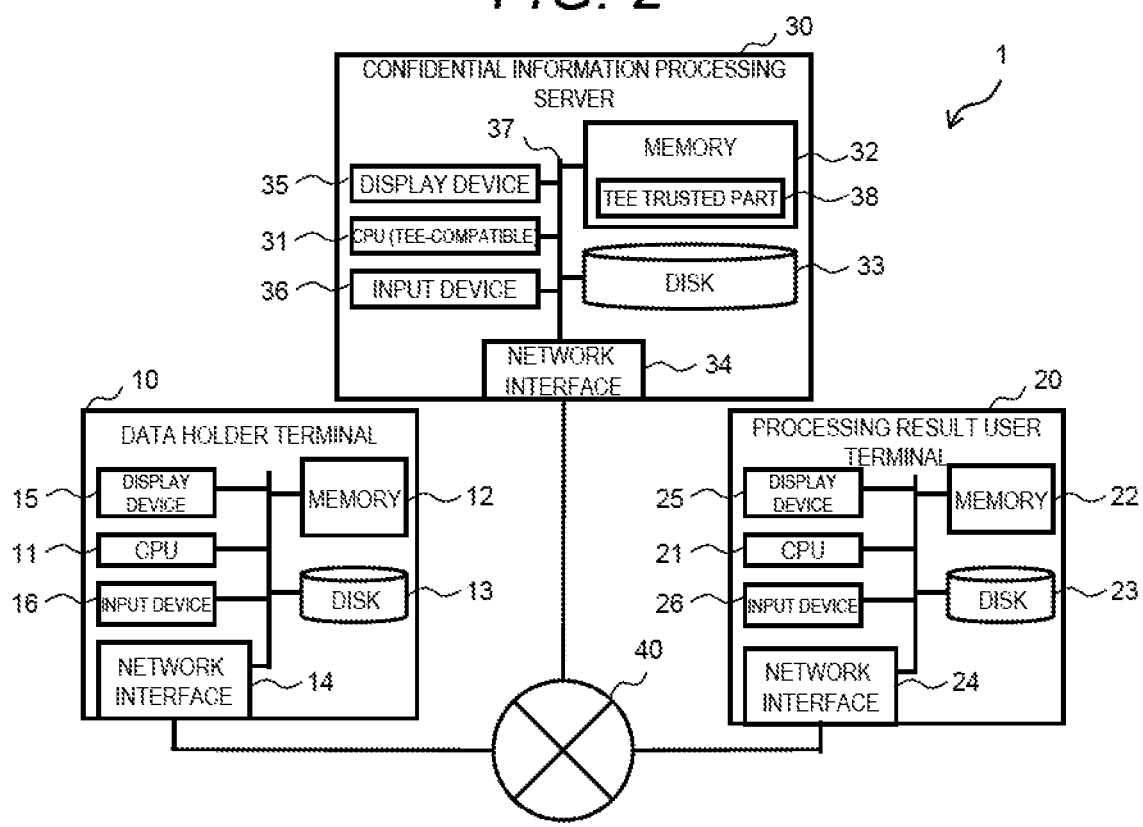
FIG. 2 is a block diagram showing a hardware configuration example of the confidential information processing system shown in FIG. 1.

FIG. 2 is a block diagram showing a hardware configuration example of the confidential information processing system shown in FIG. 1.

The data holder terminal 10 is an information processing device such as a personal computer, a smartphone, and a server device, or a virtual machine, and includes, for example, as shown in FIG. 2, a CPU 11, a memory 12, a disk 13, a network interface 14, a display device 15, and an input device 16, which are connected to each other by an internal communication line 17.

The processing result user terminal 20 is, like the data holder terminal 10, an information processing device such as a personal computer, a smartphone, and a server device, or a virtual machine, and includes, for example, as shown in FIG. 2, a CPU 21, a memory 22, a disk 23, a network interface 24, a display device 25, and an input device 26, which are connected to each other by an internal communication line 27.

The confidential information processing server 30 is an information processing device such as a personal computer, a smartphone, and a server device, or a virtual machine, and includes, for example, as shown in FIG. 2, a CPU 31, a memory 32, a disk 33, a network interface 34, a display device 35, and an input device 36, which are connected to each other by an internal communication line 37. Note that, in the confidential information processing server 30, the CPU 31 is a TEE-compatible CPU having a TEE function, and the memory 32 has a TEE trusted part 38 that is a hardware trusted part secured on the memory by the TEE-compatible CPU.

The network 40 corresponds to all communication networks such as the Internet by wire communication or wireless communication, an in-house network, or a satellite line.

Figure 3:
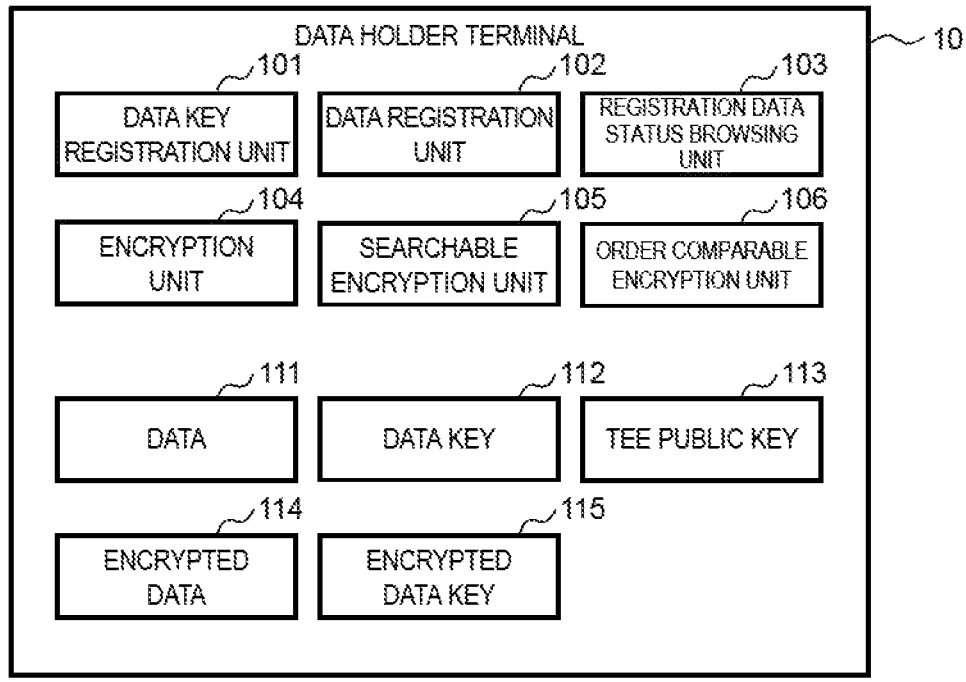
FIG. 3 is a block diagram showing a functional configuration of a data holder terminal shown in FIG. 1.

FIG. 3 is a block diagram showing a functional configuration of the data holder terminal shown in FIG. 1.

As shown in FIG. 3, the data holder terminal 10 includes a data key registration unit 101 that encrypts and registers a data key 112 in the confidential information processing server 30, a data registration unit 102 that encrypts and registers confidential information such as personal information in the confidential information processing server 30, a registration data status browsing unit 103 that provides a function for browsing the utilization status of data 111 registered by the data holder, an encryption unit 104 that encrypts the data 111 by a basic encryption technique such as advanced encryption standard (AES), a searchable encryption unit 105 that performs "searchable encryption" that enables data (encrypted data 114) to be searched while the data is encrypted, and an order comparable encryption unit 106 that performs "order comparable encryption" that enables order comparison of data (the encrypted data 114) while the data is encrypted.

Each of these functional units 101 to 106 is realized by the CPU 11 reading and executing one or more predetermined programs stored in the memory 12. The programs may be introduced into the memory 12 from a storage medium of an external device via a network and/or via a portable storage medium.

Further, the searchable encryption and the order comparable encryption described above are encryption in which processing (match comparison (search), order comparison, and the like) for extracting information that satisfies a predetermined condition can be executed while data is kept encrypted (confidential). Hereinafter, such encryption may be collectively referred to as "confidentially extractable encryption".

Further, as shown in FIG. 3, the data holder terminal 10 includes the data 111, which is confidential information such as personal information, the data key 112 used for encryption of the data 111, a TEE public key 113 used when the data key 112 is encrypted to send the data key 112 to the TEE trusted part 38 of the confidential information processing server 30, the encrypted data 114 obtained by encrypting the data 111 deposited in the confidential information processing server 30, and an encrypted data key 115 which is obtained by encrypting the data key 112 deposited in the TEE trusted part 38 of the confidential information processing server 30. These pieces of data are data necessary for processing (execution of a program) by each of the functional units 101 to 106 of the data holder terminal 10 described above and data generated by the processing, and are stored in the memory 12 or the disk 13. Note that the confidential information processing system 1 may include a plurality of the data holder terminals 10 (see FIG. 1). In a case of a plurality of the data holder terminals 10, the data holder terminals 10 may use the same data key 112 or the data keys 112 different from each other.

Figure 4:
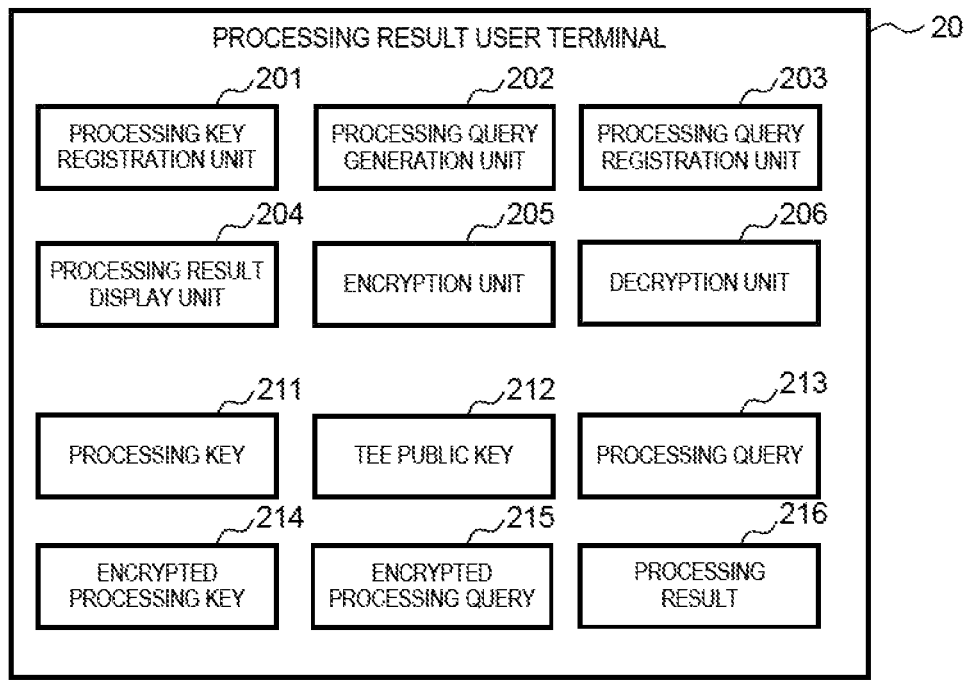
FIG. 4 is a block diagram showing a functional configuration of a processing result user terminal shown in FIG. 1.

FIG. 4 is a block diagram showing a functional configuration of the processing result user terminal shown in FIG. 1.

As shown in FIG. 4, the processing result user terminal 20 includes a processing key registration unit 201 that encrypts and registers a processing key 211 in the confidential information processing server 30, a processing query generation unit 202 that generates a processing request transmitted to the confidential information processing server 30, a processing query registration unit 203 that encrypts and registers a processing query in the confidential information processing server 30, a processing result display unit 204 that displays, to a processing result user, a processing result received from the confidential information processing server 30 on a screen, an encryption unit 205 that encrypts a processing request or the like transmitted to the confidential information processing server 30, and a decryption unit 206 that decrypts an encrypted processing result or the like received from the confidential information processing server 30. Each of these functional units 201 to 206 is realized by the CPU 21 reading and executing a predetermined program stored in the memory 22. A program for realizing each of the functional units 201 to 206 may be introduced into the memory 22 from a storage medium of an external device via a network and/or via a portable storage medium.

Further, as shown in FIG. 4, the processing result user terminal 20 has the processing key 211 used for encrypting a processing request and decrypting an encrypted processing result, a TEE public key 212 used when the processing key 211 is encrypted to send the processing key 211 to the TEE trusted part 38 of the confidential information processing server 30, a processing query 213 indicating processing target data and processing content requested by a processing result user, an encrypted processing key 214 that is a processing key obtained as the processing key 211 is encrypted using the TEE public key 212, an encrypted processing query 215 that is a processing query obtained as the processing query 213 is encrypted using the processing key 211, and a processing result 216 obtained as an encrypted processing result received from the confidential information processing server 30 is decrypted using the processing key 211. These pieces of data are data necessary for processing (execution of a program) by each of the functional units 201 to 206 of the processing result user terminal 20 described above and data generated by the processing, and are stored in the memory 22 or the disk 23. Note that the confidential information processing system 1 may include a plurality of the processing result user terminals 20 (see FIG. 1). In a case of a plurality of the processing result user terminals 20, the processing result user terminals 20 may use the same processing key 211 or the processing keys 211 different from each other.

Figure 5:
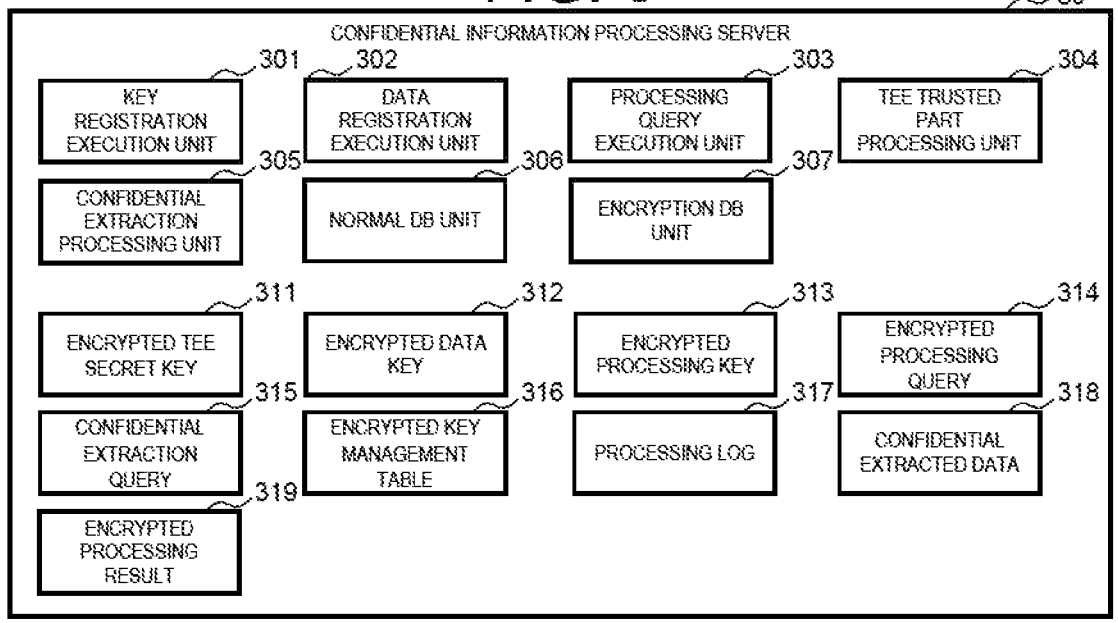
FIG. 5 is a block diagram showing a functional configuration of a confidential information processing server shown in FIG. 1.

FIG. 5 is a block diagram showing a functional configuration of the confidential information processing server shown in FIG. 1.

As shown in FIG. 5, the confidential information processing server 30 includes a key registration execution unit 301 that registers the encrypted data key 115 received from the data holder terminal 10 or the encrypted processing key 214 received from the processing result user terminal 20 in an encrypted key management table 316 through processing of a TEE trusted part processing unit 304, a data registration execution unit 302 that registers the encrypted data 114 received from the data holder terminal 10 in an encryption DB unit 307 through processing of the TEE trusted part processing unit 304, a processing query execution unit 303 that executes the encrypted processing query 215 received from the processing result user terminal 20 through processing of the TEE trusted part processing unit 304 and returns a result of the encryption processing, the TEE trusted part processing unit 304 that executes processing using a trusted part of a TEE function that is hardware-safe, a confidential extraction processing unit 305 that generates a confidential extraction query 315 upon receiving a confidential extraction request from the processing query execution unit 303 through processing of the TEE trusted part processing unit 304 and executes confidential extraction on the encryption DB unit 307, a normal DB unit 306 that stores unencrypted normal data, and the encryption DB unit 307 that stores encrypted data. Each of these functional units 301 to 307 is realized by the CPU 31 reading and executing a predetermined program stored in the memory 32. In particular, the processing by the TEE trusted part processing unit 304 is performed by the TEE-compatible CPU 31 on the TEE trusted part 38 of the memory 32. A program for realizing each of the functional units 301 to 307 may be introduced into the memory 32 from a storage medium of an external device via a network and/or via a portable storage medium.

Further, as shown in FIG. 5, the confidential information processing server 30 has an encrypted TEE secret key 311 encrypted by a TEE local key (TEE local key 334 shown in FIG. 6) that can be used only in the TEE trusted part 38, an encrypted data key 312, an encrypted processing key 313, an encrypted processing query 314 which is a processing query encrypted by a processing key, a confidential extraction query 315 that is an extraction query encrypted by using a TEE local key 334 described later, an encrypted key management table 316 that registers various encrypted keys, a processing log 317 in which a history of data processing in the confidential information processing server 30 is recorded, confidential extracted data 318 that is encrypted data extracted from the encryption DB unit 307 by the confidential extraction query 315, and an encrypted processing result 319 that is a processing result encrypted by a processing key. These pieces of data are data necessary for processing (execution of a program) by each of the functional units 301 to 307 of the confidential information processing server 30 described above and data generated by the processing, and are stored in the memory 32 or the disk 33.

Furthermore, detailed functional configurations of the TEE trusted part processing unit 304 and the encryption DB unit 307 will be described with reference to FIGS. 6 and 7.

Figure 6:
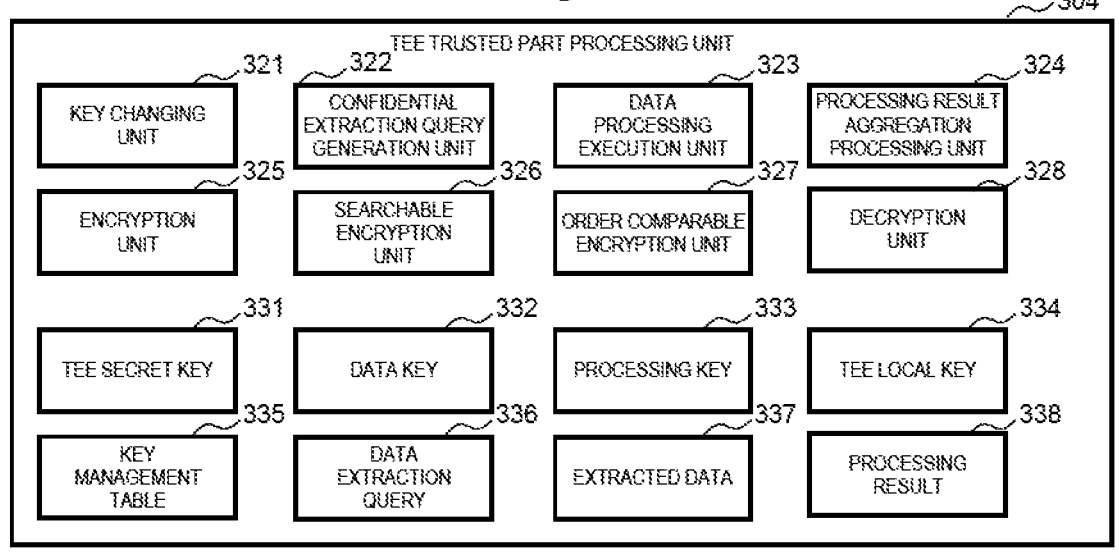
FIG. 6 is a block diagram showing a detailed functional configuration of a TEE trusted part processing unit shown in FIG. 5.

FIG. 6 is a block diagram showing a detailed functional configuration of the TEE trusted part processing unit shown in FIG. 5. The processing by the TEE trusted part processing unit 304 is provided by the TEE-compatible CPU 31 using the TEE trusted part 38 on the memory 32 from which information cannot be read by a server administrator who has the administrator authority of a server OS or a cyber attacker who takes over the administrator authority by a cyber attack. That is, in the processing by the TEE trusted part processing unit 304, plaintext processing of confidential information and various pieces of key information can be executed while confidentiality against an administrator having the administrator authority of a server and a cyber attacker is ensured.

As shown in FIG. 6, the TEE trusted part processing unit 304, as a functional unit, includes a key changing unit 321 that changes a key encryption key of a data key or a processing key, and the like, a confidential extraction query generation unit 322 that generates a confidential extraction query that enables search and order comparison while data is kept encrypted, a data processing execution unit 323 that executes analysis processing such as regression analysis and machine learning, a processing result aggregation processing unit 324 that collects a plurality of processing results output by division processing executed in a case where a data amount of processing target data is larger than the TEE trusted part 38, an encryption unit 325 that performs basic encryption such as AES, a searchable encryption unit 326 that performs searchable encryption that enables search while data is kept encrypted, an order comparable encryption unit 327 that performs order comparable encryption that enables order comparison while data is kept encrypted, and a decryption unit 328 that decrypts encrypted data, a processing query, various pieces of key information, and the like.

Further, as shown in FIG. 6, the TEE trusted part processing unit 304 has a TEE secret key 331, which is a pair key of the TEE public key 113 that can be used only inside the TEE trusted part 38, a data key 332 obtained by decrypting, with the TEE secret key 331, a data key encrypted with the TEE public key 113, a processing key 333 obtained by decrypting, with the TEE secret key 331, a processing key encrypted with the TEE public key 113, a TEE local key 334 that is generated from unique information of the TEE-compatible CPU 31 and used only inside the TEE trusted part 38, a key management table 335 obtained by decrypting the encrypted key management table 316 with the TEE local key 334, a data extraction query 336 generated by the confidential extraction query generation unit 322, extracted data 337 obtained by decrypting confidential extracted data input to the TEE trusted part processing unit 304, and a processing result 338 that is a result of data processing executed by the data processing execution unit 323.

Figure 7:
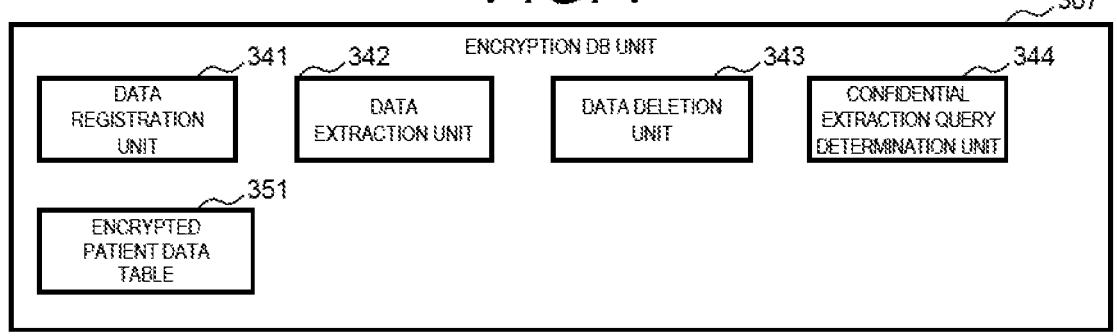
FIG. 7 is a block diagram showing a detailed functional configuration of an encryption DB unit shown in FIG. 5.

FIG. 7 is a block diagram showing a detailed functional configuration of the encryption DB unit shown in FIG. 5. FIG. 7 shows a detailed functional configuration of the encryption DB unit 307 in a case where the encryption DB unit 307 holds an encrypted patient data table 351 as an example of a database in which the encryption DB unit 307 registers encrypted data.

As shown in FIG. 7, the encryption DB unit 307 includes a data registration unit 341 that registers data in the encrypted patient data table 351, a data extraction unit 342 that extracts encrypted data corresponding to a confidential extraction query from the encrypted patient data table 351, a data deletion unit 343 that deletes data corresponding to a specified condition from the encrypted patient data table 351, a confidential extraction query determination unit 344 that performs matching determination or order-comparison determination of encrypted data and an encrypted processing query in execution of a confidential extraction query. Then, data registered from the data holder terminal 10 is encrypted and registered in the encrypted patient data table 351.

(2) Processing

Processing executed in the confidential information processing system 1 according to the present embodiment will be described.

Figures 8, 9:
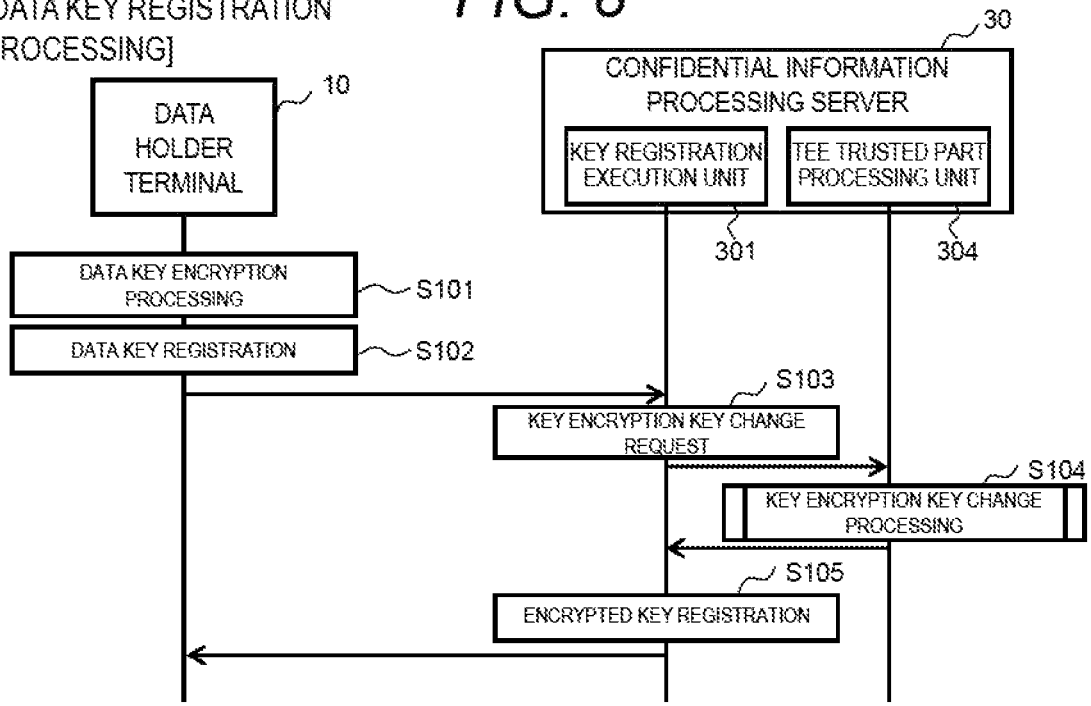
FIG. 8 is a sequence diagram showing a processing process of data key registration processing.
FIG. 9 is an example of an encrypted key management table.
Figure 12:
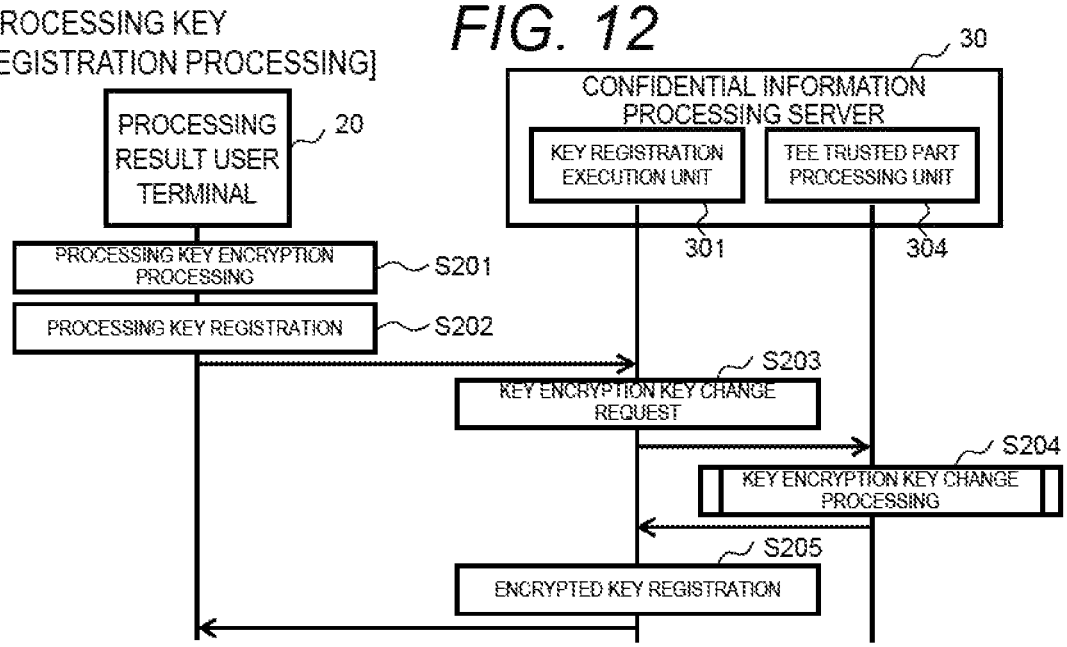
FIG. 12 is a sequence diagram showing a processing process of processing key registration processing.

As a process of the overall processing, first, the confidential information processing system 1 performs "data key registration processing" for registering a data key between the data holder terminal 10 and the confidential information processing server 30, and "processing key registration processing" for registering a processing key between the processing result user terminal 20 and the confidential information processing server 30 as preliminary preparation for performing "data registration processing" for encrypting confidential information such as personal information deposited from a data holder and registering the information in the confidential information processing server 30. Details of the data key registration processing are shown in FIG. 8, and details of the processing key registration processing are shown in FIG. 12.

Figure 13:
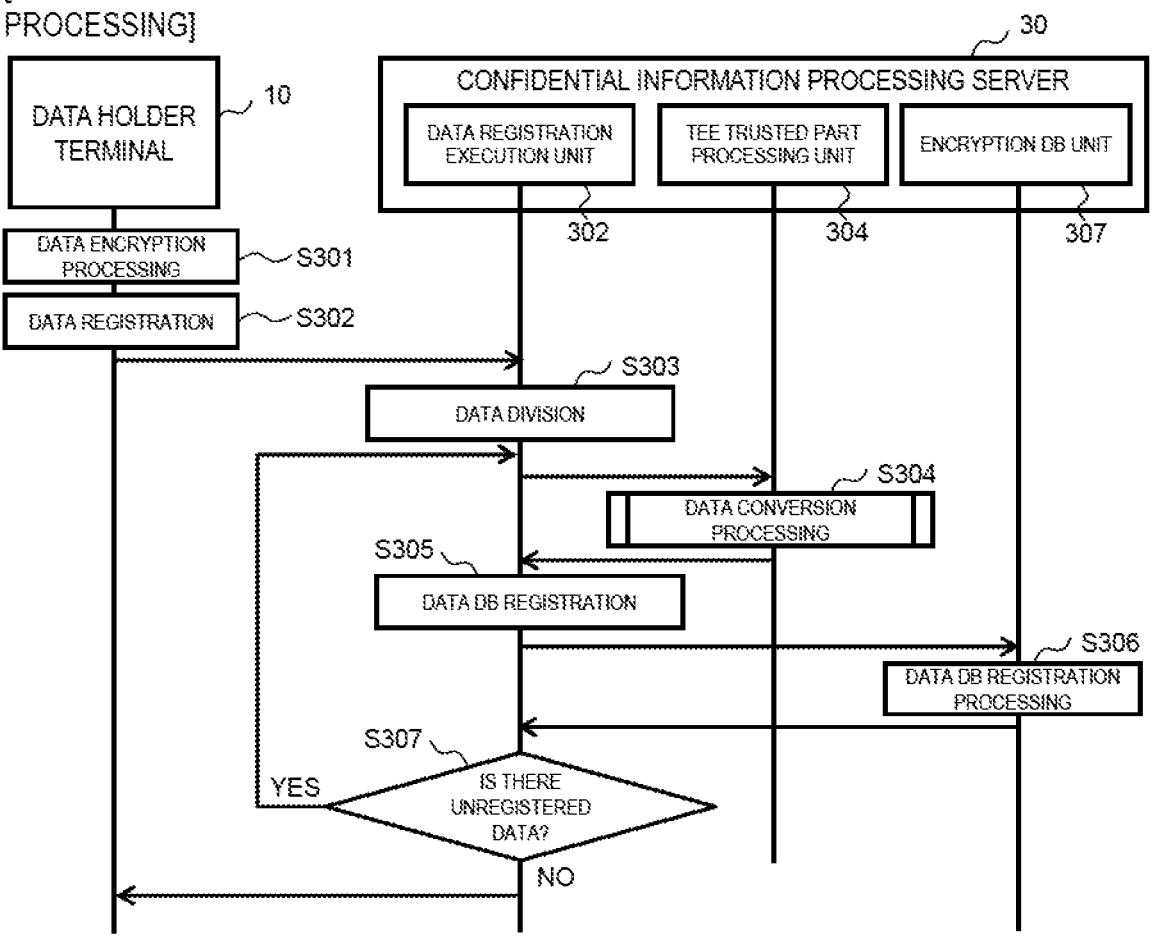
FIG. 13 is a sequence diagram showing a processing process of data registration processing.

Next, the confidential information processing system 1 performs "data registration processing" between the data holder terminal 10 and the confidential information processing server 30. In the data registration processing, confidential information (data) such as personal information deposited from a data holder is encrypted using a data key in the data holder terminal 10, and further applied with confidentially extractable encryption in the confidential information processing server 30 so as to be registered. Details of the data registration processing are shown in FIG. 13.

Figure 18:
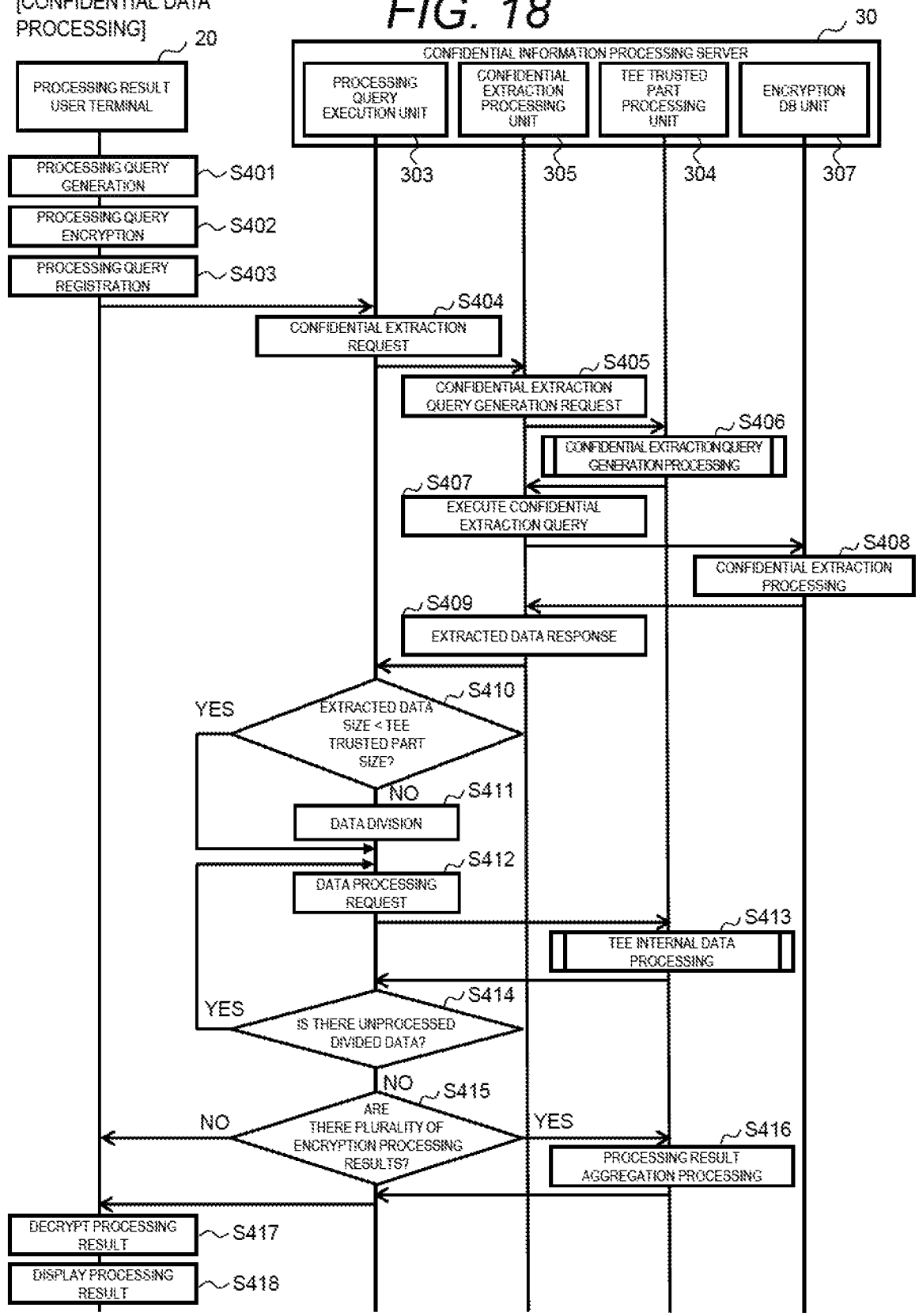
FIG. 18 is a sequence diagram showing a processing process of confidential data processing.

Then, after the data registration processing is performed, the confidential information processing system 1 can perform "confidential data processing", in which processing requested by a processing result user is executed in a confidential manner and a result of the processing is displayed on the processing result user terminal 20, for confidentially-extractable encrypted confidential information (confidential data) registered in the confidential information processing server 30. Details of the confidential data processing are shown in FIG. 18.

Hereinafter, the processing described above will be described in detail with reference to the drawings.

(2-1) Data Key Registration Processing

FIG. 8 is a sequence diagram showing a processing process of the data key registration processing. The data key registration processing is executed by the data holder terminal 10 and the confidential information processing server 30.

According to FIG. 8, first, the data key registration unit 101 of the data holder terminal 10 executes data key encryption processing for inputting the data key 112 together with the TEE public key 113 to the encryption unit 104 and obtaining the encrypted data key 115 as an output (Step S101).

Next, the data key registration unit 101 of the data holder terminal 10 transmits data key registration information including information of the encrypted data key 115, an owner "data holder terminal 10" and a key type "data key" to the confidential information processing server 30 (Step S102). The processing of Step S102 corresponds to a registration request for a data key from the data holder terminal 10 to the confidential information processing server 30.

Next, upon receiving the data key registration information transmitted in Step S102, the key registration execution unit 301 of the confidential information processing server 30 transmits a key encryption key change request including the encrypted data key 115 to the TEE trusted part processing unit 304 (Step S103).

Next, the TEE trusted part processing unit 304 executes key encryption key change processing described later in FIG. 10 in response to the key encryption key change request of Step S103, generates an encrypted data key obtained by changing a key encryption key to the TEE local key 334, and transmits the key to the key registration execution unit 301 (Step S104).

Next, the key registration execution unit 301 adds a record including the owner "data holder terminal 10", the key type "data key", and the encrypted data key (encrypted data key 312) encrypted with the TEE local key 334 in Step S104 to the encrypted key management table 316, and returns a completion response of key registration to the data holder terminal 10 (Step S105). Note that in a case where the key encryption key change processing of Step S104 is unnecessary, such as when the number of the data holder terminal 10 is one, the key registration execution unit 301 may directly register the encrypted data key 115 included in the data key registration information received from the data holder terminal 10 in the encrypted key management table 316.

Here, FIG. 9 shows an example of the encrypted key management table registered by the processing of encrypted key registration. The encrypted key management table 316 exemplified in FIG. 9 is composed of an "owner" column indicating an owner of a key, a "key type" column indicating a type of a key, and an "encrypted key" column storing an encrypted key. Specifically, for example, a record 3161 in a first row indicates that an encrypted key obtained by encrypting a data key owned by the data holder terminal 10 is "tojqj5dscs77gkl5". On the other hand, a record 3162 in a second row indicates that an encrypted key obtained by encrypting a processing key owned by the processing result user terminal 20 is "f6hpjsgwmivexmhz". Note that, also in processing of encrypted key registration in processing key registration processing described later (Step S205 in FIG. 12), the encrypted key management table 316 is registered in a format similar to that in FIG. 9.

After the processing of Step S105, upon receiving a completion response of key registration from the confidential information processing server 30 (the key registration execution unit 301), the data holder terminal 10 finishes the data key registration processing.

(2-1-1) Key Encryption Key Change Processing

FIG. 10 is a flowchart showing a processing process of key encryption key change processing. As described in Step S104 in FIG. 8, the key encryption key change processing is a processing executed by the TEE trusted part processing unit 304 in response to a key encryption key change request from the key registration execution unit 301 (Step S103 in FIG. 8).

According to FIG. 10, first, upon receiving a key encryption key change request from the key registration execution unit 301, the TEE trusted part processing unit 304 reads the TEE secret key 331 (Step S111).

Next, the TEE trusted part processing unit 304 inputs an encrypted key (the encrypted data key 115) included in the key encryption key change request to the decryption unit 328 together with the TEE secret key 331 read in Step S111 for decryption (Step S112). Here, the encrypted data key 115 included in the key encryption key change request is a key encrypted with the TEE public key 113 (see Step S101 in FIG. 8), and the processing of Step S112 decrypts such an input key using the TEE secret key 331.

Next, the TEE trusted part processing unit 304 reads the TEE local key 334 (Step S113).

Next, the TEE trusted part processing unit 304 encrypts the input key with the TEE local key 334 by inputting the input key decrypted in Step S112 and the TEE local key 334 read in Step S113 into the encryption unit 325 (Step S114).

Further, the TEE trusted part processing unit 304 registers the input key decrypted in Step S112 in the key management table 335 (Step S115).

Here, FIG. 11 shows an example of the key management table. The key management table 335 exemplified in FIG. 11 is composed of an "owner" column indicating an owner of a key, a "key type" column indicating a type of a key, and a "key" column storing a key. Specifically, for example, a record 3351 in a first row indicates that a data key owned by the data holder terminal 10 is "vf0l04ugdqjsql1j". On the other hand, a record 3352 in a second row indicates that a processing key owned by the processing result user terminal 20 is "mgyk3lvqbpdco4uo". The "key" stored in the key management table 335 can be considered to be a key obtained by decrypting the encrypted key (see FIG. 9) stored in the encrypted key management table 316 with the TEE local key 334. Note that, as described above, since the key management table 335 is held inside the TEE trusted part 38, the security of the key is guaranteed.

Finally, the TEE trusted part processing unit 304 transmits this encrypted input key (the encrypted data key 312) to the key registration execution unit 301 as an output for a key encryption key change request, and the key encryption key change processing is finished.

(2-2) Processing Key Registration Processing

FIG. 12 is a sequence diagram showing a processing process of the processing key registration processing. The processing key registration processing is executed by the processing result user terminal 20 and the confidential information processing server 30.

According to FIG. 12, first, the processing key registration unit 201 of the processing result user terminal 20 executes processing key encryption processing for inputting the processing key 211 together with the TEE public key 212 to the encryption unit 205 and obtaining the encrypted processing key 214 as an output (Step S201).

Next, the processing key registration unit 201 transmits processing key registration information including information of the encrypted processing key 214, an owner "processing result user terminal 20" and a key type "processing key" to the confidential information processing server 30 (Step S202). The processing of Step S202 corresponds to a registration request for a processing key from the processing result user terminal 20 to the confidential information processing server 30.

Next, upon receiving the processing key registration information transmitted in Step S202, the key registration execution unit 301 of the confidential information processing server 30 transmits a key encryption key change request including the encrypted processing key 214 to the TEE trusted part processing unit 304 (Step S203).

Next, the TEE trusted part processing unit 304 executes the key encryption key change processing shown in FIG. 10 in response to the key encryption key change request of Step S203, generates an encrypted processing key obtained by changing a key encryption key to the TEE local key 334, and transmits the key to the key registration execution unit 301 (Step S204).

Next, the key registration execution unit 301 adds a record including the owner "processing result user terminal 20", the key type "processing key", and the encrypted data key (the encrypted processing key 313) encrypted with the TEE local key 334 in Step S204 to the encrypted key management table 316, and returns a completion response of key registration to the processing result user terminal 20 (Step S205). Note that in a case where the key encryption key change processing of Step S204 is unnecessary, such as when the number of the processing result user terminal 20 is one, the key registration execution unit 301 may directly register the encrypted processing key 214 included in the processing key registration information received from the processing result user terminal 20 in the encrypted key management table 316.

Finally, upon receiving a completion response of key registration from the confidential information processing server 30 (the key registration execution unit 301), the processing result user terminal 20 finishes the processing key registration processing.

(2-3) Data Registration Processing

FIG. 13 is a sequence diagram showing a processing process of the data registration processing. The data registration processing is executed by the data holder terminal 10 and the confidential information processing server 30.

According to FIG. 13, first, the data holder terminal 10 executes processing of encrypting, in advance, data to be registered in the confidential information processing server 30 (Step S301). Specifically, the data registration unit 102 of the data holder terminal 10 inputs the data 111 and the data key 112 to the encryption unit 104, and obtains the encrypted data 114 as an output. Note that in a case where the data conversion processing of Step S304 described later is unnecessary, such as when the number of the data holder terminal 10 is one in the confidential information processing system 1, the processing of Step S301 may be performed in such a manner that data of a nominal value such as gender in the data 111 is applied with searchable encryption using the searchable encryption unit 105, and numerical data such as age and height is applied with order comparable encryption using the order comparable encryption unit 106. Here, examples of the data 111 used in the data registration processing and the encrypted data 114 registered on the data holder terminal 10 side in the data registration processing are shown in FIGS. 14 and 15.

FIG. 14 is an example of data used in the data registration processing. In FIG. 14, as an example of the data 111 used in the data registration processing, a patient data table 1110 that summarizes patient data owned by a hospital is shown.

The patient data table 1110 of FIG. 14 is configured to have columns for name, address, gender, age, height, and weight. Specifically, for example, a record 1111 in a first row indicates that Ms. Hanako Suzuki's address is Tokyo, gender is female, age is 28, height is 170.1 cm, and weight is 72.4 kg. Note that, as a matter of course, the data 111 that can be used in the confidential information processing system 1 according to the present embodiment is not limited to the patient data as described above, and all types of confidential information, such as personal information owned by a data holder such as a hospital or an information bank can be employed.

FIG. 15 is an example of encrypted data registered on the data holder terminal side in the data registration processing. In FIG. 15, as an example of the encrypted data 114 registered on the data holder terminal 10 side, an encrypted patient data table 1140 obtained by encrypting the patient data table 1110 of FIG. 14 with the data key 112 is shown.

The encrypted patient data table 1140 of FIG. 15 is configured to have columns for name, address, gender, age, height, and weight, like the patient data table 1110 (see FIG. 14) before encryption. However, in each record, values of all columns are encrypted with the data key 112. For example, a record 1141 in a first row is a record obtained by encrypting a value of each column of the record 1111 in FIG. 14.

Returning to the explanation of FIG. 13. Following the processing of Step S301, the data registration unit 102 of the data holder terminal 10 transmits a data registration request including the encrypted data 114 and information of an owner "data holder terminal 10" to the data registration execution unit 302 of the confidential information processing server 30 (Step S302).

Next, upon receiving the data registration request transmitted in Step S302, the data registration execution unit 302 of the confidential information processing server 30 divides data in a case where a data amount of the encrypted data 114 included in the request exceeds an upper limit of a data amount that can be processed by the TEE trusted part processing unit 304 at once (Step S303). For example, in a case where a data amount of the encrypted data 114 is 1 GB and an upper limit value of a data amount that the TEE trusted part processing unit 304 can process at once is 100 MB, the data registration execution unit 302 divides the encrypted data 114 into ten pieces of data each having 100 MB. Note that, in a case where a data amount of the encrypted data 114 included in the data registration request is within the upper limit of a data amount that the TEE trusted part processing unit 304 can process at once, the processing proceeds to a next process without performing the data division.

Next, the data registration execution unit 302 reads a corresponding encrypted data key from the encrypted key management table 316 by using the information of an owner "data holder terminal 10" included in the data registration request and the information of a key type "data key" included in the data key registration information received in the data key registration processing as a key, and transmits the data key to the TEE trusted part processing unit 304 together with the encrypted data (a piece of divided data in a case where the data division is performed in Step S303) included in the data registration request. In response to this, the TEE trusted part processing unit 304 executes the data conversion processing for converting the received encrypted data into data prepared for "search comparison and order comparison in an encrypted state" to be performed later, and returns encrypted data after conversion (encrypted data that is confidentially extractable) as an execution result to the data registration execution unit 302 (Step S304).

Although details will be described later with reference to FIG. 17, in the data conversion processing, the received encrypted data is decrypted in the TEE trusted part 38, and the confidentially extractable encryption is performed using the TEE local key 334. Note that, as described above, in a case where searchable encryption or order comparable encryption is performed in Step S301 in a case, for example, the number of the data holder terminal 10 is one in the confidential information processing system 1, the processing of Step S304 can be skipped.

Next, the data registration execution unit 302 transmits a registration request for the encrypted data to the encryption DB unit 307 (Step S305).

Then, the encryption DB unit 307 that has received the registration request of Step S305 uses the data registration unit 341 to register the encrypted data in a database (in the present example, the encrypted patient data table 351) as a registration target, and, after the registration is completed, transmits a completion response to the data registration execution unit 302 (Step S306).

Figures 16, 17:
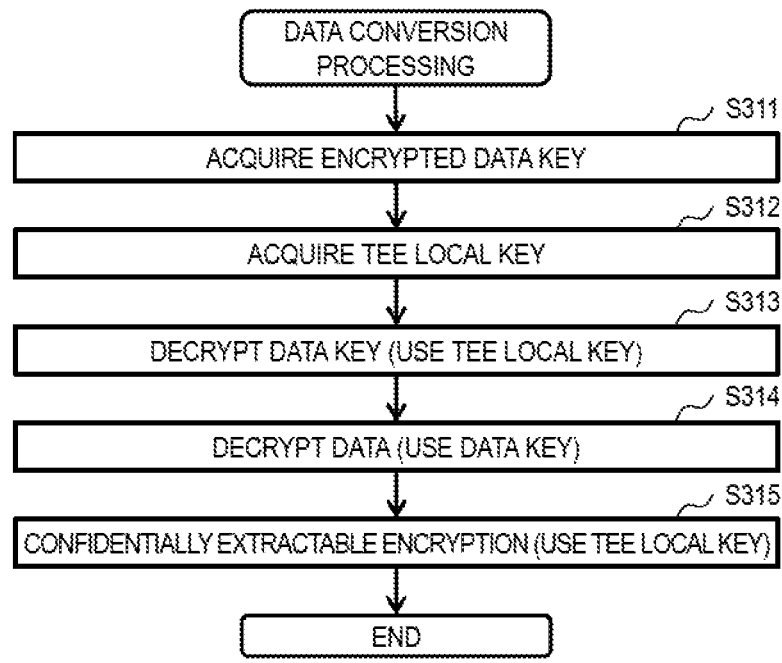
FIG. 16 is an example of encrypted data (encrypted patient data table) registered on a confidential information processing server side in the data registration processing.
FIG. 17 is a flowchart showing a processing process of data conversion processing.

Here, FIG. 16 shows an example of encrypted data (encrypted patient data table) registered on the confidential information processing server side in the data registration processing. In FIG. 16, as an example of the encrypted data stored in the encryption DB unit 307 in Step S306, when the encrypted data requested to be registered by the data holder terminal 10 in Step S302 is the encrypted patient data table 1140 of FIG. 15, the encrypted patient data table 351 that is confidentially-extractable encrypted with the TEE local key 334 through the processing of Steps S303 to S306 in the confidential information processing server 30 is shown.

The encrypted patient data table 351 of FIG. 16 is configured to have columns for name, address, gender, age, height, and weight, like the encrypted patient data table 1140 (see FIG. 15) when data registration is requested and the patient data table 1110 (see FIG. 14) before encryption. However, in each record, all values of columns in the encrypted patient data table 1140 are encrypted in a confidentially extractable manner with another key (the TEE local key 334). For example, a record 3511 in a first row corresponds to the record 1141 in FIG. 15 (in other words, the record 1111 in FIG. 14), and a value of each column of the record 3511 is obtained by encrypting a value of each column of the record 1111 in a confidentially-extractable manner with the TEE local key 334.

Returning to the explanation of FIG. 13. Following the processing of Step S306, the data registration execution unit 302 checks the presence or absence of divided data (unregistered data) whose registration in the encryption DB unit 307 is not completed (Step S307). In a case where there is unregistered data in Step S307 (YES in Step S307), the processing in and after Step S304 is performed on the unregistered data, and in a case where there is no unregistered data (NO in Step S307), the data registration execution unit 302 returns a completion response of the data registration to the data holder terminal 10.

Finally, upon receiving the completion response from the data registration execution unit 302 of the confidential information processing server 30, the data holder terminal 10 finishes the data registration processing.

(2-3-1) Data Conversion Processing

FIG. 17 is a flowchart showing a processing process of the data conversion processing. As described in Step S304 of FIG. 13, the data conversion processing is processing is executed by the TEE trusted part processing unit 304 in response to input of an encrypted data key and encrypted data (one piece of divided data) from the data registration execution unit 302.

According to FIG. 17, first, the TEE trusted part processing unit 304 reads an encrypted data key input from the data registration execution unit 302 (Step S311), and further reads the TEE local key 334 (Step S312).

Next, the TEE trusted part processing unit 304 inputs the encrypted data key read in Step S311 to the decryption unit 328 together with the TEE local key 334 read in Step S312 for decryption (Step S313).

Next, the TEE trusted part processing unit 304 decrypts the encrypted data input from the data registration execution unit 302, using the data key obtained by decryption in Step S313 (Step S314).

Next, the TEE trusted part processing unit 304 performs "confidentially extractable encryption" on the data decrypted in Step S314 by using the TEE local key 334 read in Step S312 (Step S315). As described above, the "confidentially extractable encryption" is encryption, in which processing (search or order comparison) for extracting information satisfying a predetermined condition can be executed while data is kept encrypted (kept confidential). To explain the confidentially extractable encryption in Step S315 more specifically, for example, searchable encryption is performed on data of a nominal value such as gender by using the searchable encryption unit 326, and order comparable encryption is performed on numerical data such as age and height by using the order comparable encryption unit 327. Note that the encryption unit 325 may be used to perform basic encryption such as AES for data that is not the subject of confidential extraction in search and order comparison, and the like.

When the encryption in Step S315 is completed, the TEE trusted part processing unit 304 transmits the encrypted data to a request source of the processing and ends the data conversion processing.

(2-4) Confidential Data Processing

FIG. 18 is a sequence diagram showing a processing process of the confidential data processing. The confidential data processing is executed by the processing result user terminal 20 and the confidential information processing server 30.

According to FIG. 18, first, in the processing result user terminal 20, the processing query generation unit 202 generates the processing query 213 including a condition of target data and processing content (Step S401).

Note that information on target data and a processing method necessary for generating the processing query 213 in Step S401 is input by a processing result user (user) through a processing query generation screen 410. The processing query generation screen 410 is, for example, displayed on the display device 25 or the like (may be the display device 35 of the confidential information processing server 30 or the like) under the control of the processing query generation unit 202, and the user performs input operation by using the input device 26 on the screen. Then, the processing query generation unit 202 generates the processing query 213 according to the input content of the user on the processing query generation screen 410. Here, examples of the processing query generation screen 410 and the processing query 213 are shown in FIGS. 19 and 20.

FIG. 19 is an example of the processing query generation screen. The processing query generation screen 410 illustrated in FIG. 19 roughly includes target data input regions (regions 4101 to 4106) for inputting target data and a narrowing condition for the target data, processing method input regions (regions 4107 to 4110) for inputting a processing method for target data, and input determination regions (regions 4111 to 4112) for inputting OK or cancel for the input content.

Specifically, the target data input region includes the region 4101 for inputting a table name of target data, the region 4102 for inputting a target column name of a narrowing condition 1 for target data, the region 4103 for designating a keyword which is a narrowing condition for a column input in the region 4102, the region 4104 for inputting a target column name of a narrowing condition 2 for target data, and the regions 4105 and 4106 for inputting an upper limit value and a lower limit value of a range which are narrowing conditions for a column input in the region 4104.

Further, the processing method input region includes the region 4107 for inputting a type of a processing method, the region 4108 for inputting a regression model that needs to be designated for the processing method (in the present example, "regression analysis") input in the region 4107, the region 4109 for designating an explanatory variable X, and the region 4110 for designating an objective variable Y.

Further, the input determination region includes the region 4111 showing an "OK" button for determining input content and completing the processing, and the region 4112 showing a "Cancel" button for canceling input content and completing the processing.

FIG. 20 is an example of the processing query. As illustrated in FIG. 20, the processing query 213 includes a region 2131 indicating processing target data and a region 2132 indicating a processing method.

More specifically, the processing query 213 of FIG. 20 means a processing query for executing processing of extracting a record group, in which a value of the gender column is "male" and a value of the age column is "0 to 15" from the patient data table 1110 (see FIG. 14) stored in the data 111, and executing regression analysis with the height column as the explanatory variable X and the age column as the objective variable Y in a regression model "Y=aX+b" for the extracted record group.

Returning to the explanation of FIG. 18. Following the processing of Step S401, in the processing result user terminal 20, the processing query registration unit 203 encrypts the processing query 213 generated in Step S301 (Step S402). Specifically, the processing query registration unit 203 inputs the processing key 211 and the processing query 213 to the encryption unit 205, and obtains the encrypted processing query 215 as an output.

Figure 21:
FIG. 21 is an example of an encrypted processing query.

FIG. 21 is an example of the encrypted processing query. As illustrated in FIG. 21, the encrypted processing query 215 obtained by encrypting the processing query 213 with the processing key 211 includes a region 2151 indicating processing target data and a region 2152 indicating a processing method. More specifically, the region 2151 shows encrypted data corresponding to the region 2131 of the processing query 213 shown in FIG. 20, and the region 2152 shows encrypted data corresponding to the region 2132 of the processing query 213.

Following the processing of Step S402, in the processing result user terminal 20, the processing query registration unit 203 registers the encrypted processing query 215 and information of an owner "processing result user terminal 20" in the processing query execution unit 303 of the confidential information processing server 30 (Step S403).

Next, in the confidential information processing server 30, the processing query execution unit 303 transmits a confidential extraction request with the encrypted processing query 215 and owner information "processing result user terminal 20" received in Step S403 as input to the confidential extraction processing unit 305 (Step S404).

Next, the confidential extraction processing unit 305 receiving the confidential extraction request extracts the encrypted processing key 313 from the encrypted key management table 316 using the owner information "processing result user terminal 20" and information of a key type "processing key" as keys. Note that the information of a key type "processing key" can be acquired by referring to the encrypted key management table 316 using the owner information "processing result user terminal 20" as a key, for example. Then, the confidential extraction processing unit 305 transmits a confidential extraction query generation request to the TEE trusted part processing unit 304 with the encrypted processing key 313 and the encrypted processing query 215 as input (Step S405).

Next, the TEE trusted part processing unit 304 executes confidential extraction query generation processing with the encrypted processing key 313 and the encrypted processing query 215 input by the confidential extraction query generation request as inputs, and returns the confidential extraction query 315 obtained as an output to the confidential extraction processing unit 305 (Step S406).

Although details will be described later with reference to FIG. 27, in the confidential extraction query generation processing, in the TEE trusted part 38, the data extraction query 336 (see FIG. 28, which will be described later) of plaintext is generated based on a processing query obtained by decrypting the encrypted processing query 215, and the confidential extraction query 315 obtained by encrypting part of the data extraction query 336 in a confidentially extractable encryption using the TEE local key 334 is generated.

Figure 22:
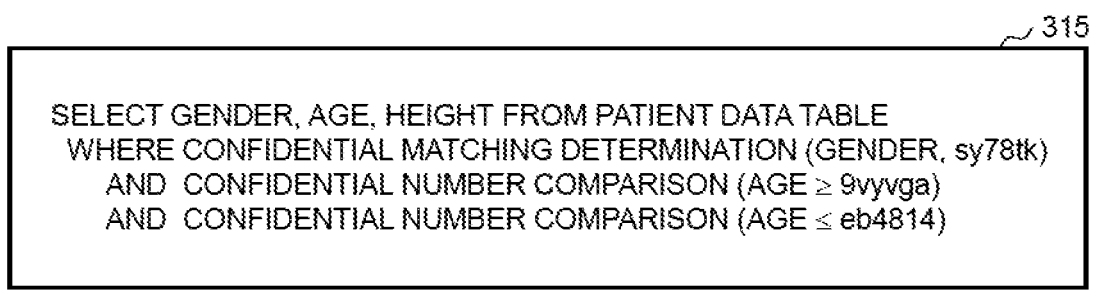
FIG. 22 is an example of a confidential extraction query.

FIG. 22 is an example of the confidential extraction query. The confidential extraction query 315 illustrated in FIG. 22 is configured as a SQL query for searching a database, and is configured in a manner that, in particular, a match determination conditional statement in a WHERE clause is replaced with a confidential match determination function, a large and small comparison conditional statement in a WHERE clause is replaced with a confidential order comparison function, a search keyword indicating a search condition is replaced with a searchable cipher query, and a boundary value indicating a boundary condition of large and small comparison is replaced with an order comparable cipher query. Note that the confidential match determination function and the confidential order comparison function described above can be referred to as a confidential extraction determination function since they are functions that perform condition determination of data while encrypted to extract the data.

The confidential extraction query 315 illustrated in FIG. 22 corresponds to the data extraction query 336 illustrated in FIG. 28 described later, and, by comparing the two, a location replaced with encryption that can be made confidential can be found. Specifically, in FIG. 22, the confidential extraction query 315 replaces a match determination conditional statement of "gender=male" with a confidential match determination function and a value of "sy78tk" which is obtained by converting "male" into a searchable cipher query, and furthermore, replaces large and small comparison conditional statements of "age≥0" and "age≤15" with a confidential number comparison function and values of "9vyvga" and "eb4814" obtained by converting "0" and "15" into an order comparable cipher query.

Next, upon receiving a response of the confidential extraction query generation processing from the TEE trusted part processing unit 304, the confidential extraction processing unit 305 transmits the received confidential extraction query 315 to the encryption DB unit 307 and requests query execution (Step S407).

Next, the encryption DB unit 307 executes confidential extraction processing for extracting data while being encrypted based on the confidential extraction query 315 received in Step S407 (Step S408). In the confidential extraction processing, first, the confidential extraction query 315 is input to the data extraction unit 342. Then, the data extraction unit 342 obtains a determination result by inputting a conditional statement to the confidential extraction query determination unit 344 for determination processing for a conditional statement that requires the confidential match determination or the confidential order determination in the data extraction processing of a database, and extracts data (the confidential extracted data 318) that matches with the conditions. Then, the encryption DB unit 307 returns the extracted confidential extracted data 318 to the confidential extraction processing unit 305 as a result of the confidential extraction processing.

Figures 23, 24:
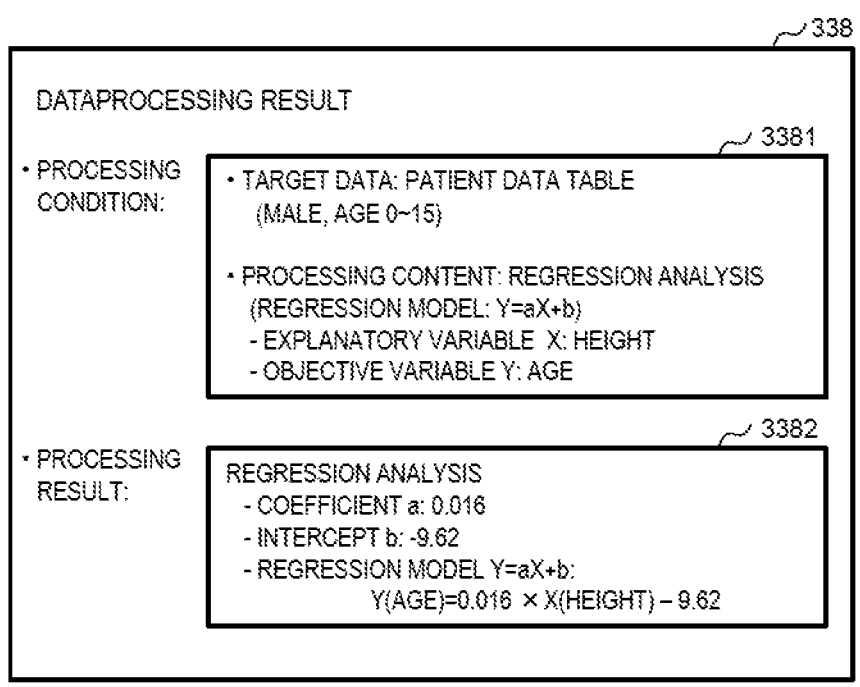
FIG. 23 is an example of confidential extracted data.
FIG. 24 is an example of a processing result obtained by data processing.

FIG. 23 is an example of the confidential extracted data. In a case of FIG. 23, the confidential extracted data 318 is data extracted from the encrypted patient data table 351 based on the confidential extraction query 315, and includes a gender column, an age column, and a height column. Each column value of the confidential extracted data 318 is encrypted. For example, when a focus is placed on a record 3181 in a first row, a value of each column is shown to be kept encrypted in the record that is extracted while being encrypted by the confidential extraction.

Next, the confidential extraction processing unit 305 returns the confidential extracted data 318 received as a response in Step S408 to the processing query execution unit 303 as a response to the confidential extraction request of Step S404 (Step S409).

Next, the processing query execution unit 303 compares a data amount of the confidential extracted data 318 received as a response in Step S409 with an upper limit value of a data amount that can be handled by the TEE trusted part 38 (Step S410). In a case where the confidential extracted data 318 is larger (NO in Step S410), Step S411 is executed and then the processing proceeds to Step S412, and in other cases (YES in Step S410), Step S411 is skipped and the processing proceeds to Step S412.

In Step S411, the processing query execution unit 303 divides the confidential extracted data 318. For example, in a case where a data amount of the confidential extracted data 318 is 1 GB and an upper limit value of the TEE trusted part 38 is 100 MB, the data is divided into ten pieces of divided data of 100 MB.

Next, the processing query execution unit 303 transmits a data processing request with the confidential extracted data 318 (one piece of divided data in a case where the data is divided in Step S411) and the encrypted processing query 215 as input to the TEE trusted part processing unit 304 (Step S412).

Next, the TEE trusted part processing unit 304 executes TEE internal data processing with the confidential extracted data 318 (one piece of divided data in a case where the data is divided in Step S411) and the encrypted processing query 215 as input, and returns the encrypted processing result 319 obtained as an output of the processing to the processing query execution unit 303 (Step S413).

Although details will be described later with reference to FIGS. 29 and 31, in the TEE internal data processing, the processing result 338 in plaintext is output by the data processing (Step S434 in FIG. 29, FIG. 31), and this processing result 338 is encrypted with the processing key 333, so that the encrypted processing result 319 is obtained. Here, examples of the processing result 338 and the encrypted processing result 319 are shown in FIGS. 24 and 25.

FIG. 24 is an example of the processing result obtained by the data processing. As illustrated in FIG. 24, the processing result 338 includes a region 3381 and a region 3382. For example, the region 3381 shows a summary of target data and processing content in plaintext, and the region 3382 shows a summary of a processing result in plaintext.

FIG. 25 is an example of the encrypted processing result obtained by the TEE internal data processing. As illustrated in FIG. 25, the encrypted processing result 319 includes a region 3191 and a region 3192. As described above, the encrypted processing result 319 is obtained by encrypting, with the processing key 333, the processing result 338 (see FIG. 24) in plaintext obtained in the TEE internal data processing. Therefore, a ciphertext is shown in each region. Specifically, for example, the region 3191 shows a ciphertext obtained by encrypting a summary of target data and processing content, and the region 3192 shows a ciphertext obtained by encrypting a summary of a processing result.

Next, upon receiving a response of the encrypted processing result 319 by the TEE internal data processing, the processing query execution unit 303 determines whether or not unprocessed divided data remains (Step S414). In a case where there is unprocessed divided data (YES in Step S414), the processing of Steps S412 and S413 is executed with one piece of the unprocessed divided data and the encrypted processing query 215 as input, and, in a case where there is no more unprocessed divided data (NO in Step S414), the processing proceeds to Step S415.

In Step S415, the processing query execution unit 303 counts the number of the encrypted processing results 319 and determines whether or not a plurality of the encrypted processing results 319 are obtained. In a case where the encrypted processing result 319 is single in Step S415 (NO in Step S415), this means that the data division is not performed in Step S411. In this case, the processing query execution unit 303 transmits the encrypted processing result 319 to the processing result user terminal 20.

On the other hand, in a case where there are a plurality of the encrypted processing results 319 in Step S415 (YES in Step S415), these encrypted processing results 319 mean a processing result of divided data divided in Step S411. In this case, the processing query execution unit 303 transmits a processing result aggregation request with a plurality of the encrypted processing results 319 for a plurality of pieces of divided data as input to the TEE trusted part processing unit 304.

Then, the TEE trusted part processing unit 304 that receives the processing result aggregation request decrypts a plurality of the input encrypted processing results 319 with the processing key 333, and puts together (aggregates) a plurality of the processing results 338 by combining them or the like. Then, the TEE trusted part processing unit 304 generates the encrypted processing result 319 encrypted with the processing key 333 again, and returns the encrypted processing result 319 to the processing query execution unit 303 (Step S416). Note that in processing result aggregation processing, the TEE trusted part processing unit 304 does not necessarily need to put together a plurality of processing results (the encrypted processing results 319) into one, and may put them together into a plurality. In this case, the TEE trusted part processing unit 304 returns the encrypted processing result 319 obtained by encrypting each of a plurality of processing results to the processing query execution unit 303. Then, the processing query execution unit 303 transmits, to the processing result user terminal 20, one or a plurality of the encrypted processing results 319 returned from the TEE trusted part processing unit 304.

Next, through Step S415 or Step S416, the processing result user terminal 20, which receives the encrypted processing result 319 from the processing query execution unit 303, inputs one or a plurality of the encrypted processing results 319 that are received and the processing key 211 to the decryption unit 206 so as to decrypt the encrypted processing result 319, and obtains the processing result 216 in plaintext as an output of the processing (Step S417). Specific content of the processing result 216 is similar to that of the processing result 338 shown in FIG. 24.

Then, finally, in the processing result user terminal 20, the processing result display unit 204 outputs the processing result 216 to the processing result user (user) by displaying a processing result display screen 420 on the display device 25 or the like (Step S418), and the confidential data processing ends.

FIG. 26 is an example of the processing result display screen. The processing result display screen 420 illustrated in FIG. 26 includes a region 4201 showing a summary of an original processing condition, a region 4202 showing a summary of a processing result, and a region 4203 showing an "OK" button which is pressed when reference of the processing result display screen 420 is finished.

Specifically, the region 4201 shows that single regression analysis (regression model is Y=aX+b) where a height column is an explanatory variable X and an age column is an objective variable Y is executed for a record of gender "male" and age "0 to 15" in a "patient data table" as a summary of a processing condition. Further, the region 4202 shows that a regression model in which a value of a coefficient a is "0.016" and a value of an intercept b is "−9.62" is obtained as a summary of a processing result under the processing condition shown in the region 4201.

Note that the display contents of the regions 4201 and 4202 described above are based on the processing result 216 in plaintext decrypted in Step S417 (similar to the processing result 338 shown in FIG. 24), and found to correspond to each display content on the processing result display screen 420 when reference is made to FIG. 24.

(2-4-1) Confidential Extraction Query Generation Processing

FIG. 27 is a flowchart showing a processing process of the confidential extraction query generation processing. As described in Step S406 in FIG. 18, the confidential extraction query generation processing is processing in which the encrypted processing key 313 and the encrypted processing query 215 are input, and is executed by the TEE trusted part processing unit 304.

According to FIG. 27, the TEE trusted part processing unit 304 first decrypts the encrypted processing key 214 by inputting the encrypted processing key 214 and the TEE local key 334 to the decryption unit 328, and obtains the processing key 333 as an output (Step S421).

Next, the TEE trusted part processing unit 304 decrypts the encrypted processing query 215 by inputting the encrypted processing query 215 and the processing key 333 to the decryption unit 328, and obtains a processing query as an output (Step S422). Note that the processing query obtained in Step S422 is similar to the processing query 213 shown in FIG. 20.

Next, the TEE trusted part processing unit 304 generates the data extraction query 336 in plaintext including a table name and a narrowing condition of processing target data described in a processing query based on the processing query obtained in Step S422 (Step S423).

FIG. 28 is an example of the data extraction query. As illustrated in FIG. 28, the data extraction query 336 is configured as an SQL query for searching a database. More specifically, the data extraction query 336 of FIG. 28 is an SQL query for extracting values of gender, age, and height columns of a record in which a value of a gender column is "male" and a value of an age column is "0 or more and 15 or less" from a patient data table, and a table name and a narrowing condition of processing target data described in the processing query 213 of FIG. 20 are used.

Next, the TEE trusted part processing unit 304 acquires the TEE local key 334 (Step S424), and uses this TEE local key 334 to perform confidentially extractable encryption on the data extraction query 336 generated in Step S423 (Step S425). More specifically, in Step S425, the TEE trusted part processing unit 304 inputs a keyword of a narrowing condition of a nominal value attribute in the data extraction query 336 together with the TEE local key 334 to the searchable encryption unit 326 to generate a searchable cipher query, and also inputs a boundary value of a narrowing attribute of a numeric attribute to the order comparable encryption unit 327 together with the TEE local key 334 to generate an order comparable cipher query.

Next, the TEE trusted part processing unit 304 generates the confidential extraction query 315, in which a data extraction conditional statement of the data extraction query 336 is replaced with a function name processed by the confidential extraction query determination unit 344, and a narrowing keyword and a boundary value are replaced with the searchable cipher query and the order comparable cipher query generated in Step S425 (Step S426). Then, finally, the TEE trusted part processing unit 304 outputs the confidential extraction query 315 and ends the confidential extraction query generation processing. Note that a specific example of the confidential extraction query 315 is as shown in FIG. 22.

(2-4-2) TEE Internal Data Processing

FIG. 29 is a flowchart showing a processing process of the TEE internal data processing. As described in Step S413 in FIG. 18, the TEE internal data processing is processing in which the confidential extracted data 318 (or one piece of divided data) and the encrypted processing query 215 are input, and is executed by the TEE trusted part processing unit 304.

According to FIG. 29, first, the TEE trusted part processing unit 304 reads the processing key 333 and the TEE local key 334 for decrypting the confidential extracted data 318 and the encrypted processing query 215 which are input (Step S431).

Next, the TEE trusted part processing unit 304 decrypts the encrypted processing query 215 by inputting the processing key 333 and the encrypted processing query 215 to the decryption unit 328, and obtains a processing query in plaintext as an output (Step S432). Note that the processing query in plaintext obtained in Step S432 is similar to the processing query 213 shown in FIG. 20.

Next, the TEE trusted part processing unit 304 decrypts the confidential extracted data 318 by inputting the TEE local key 334 and the confidential extracted data 318 to the decryption unit 328, and obtains the extracted data 337 in plaintext as an output (Step S433).

Here, FIG. 30 shows an example of extracted data obtained by decrypting the confidential extracted data. The extracted data 337 in FIG. 30 is obtained by decrypting the confidential extracted data 318 shown in FIG. 23 into plaintext. For this reason, the extracted data 337 of FIG. 30 is configured to have columns of gender, age, and height, like the confidential extracted data 318 of FIG. 23. Further, a record that matches with a condition of the data extraction query 336 (see FIG. 28) is extracted to each record of the extracted data 337.

For example, a record 3371 in a first row shows that the gender is male, the age is 2, and the height is 75.6 cm, which match with the condition of the data extraction query 336 shown in FIG. 28 (values of gender, age, and height columns are extracted from a record in which a value of a gender column is male, and a value of an age column is 0 or more and 15 or less). Further, the above similarly applies to records in other rows in FIG. 30.

Next, the TEE trusted part processing unit 304 causes the data processing execution unit 323 to execute predetermined data processing (in the present example, single regression analysis) with the processing query in plaintext obtained in Step S432 and the extracted data 337 in plaintext obtained in Step S433 as input (Step S434). Although details will be described later with reference to FIG. 31, the TEE trusted part processing unit 304 obtains the processing result 338 in plaintext as an output of the data processing. A specific example of the processing result 338 is as shown in FIG. 24, and includes a processing condition and a processing result.

Then, the TEE trusted part processing unit 304 inputs the processing key 333 and the processing result 338 to the encryption unit 325 to obtain the encrypted processing result 319 obtained by encrypting the processing result 338 (Step S435). A specific example of the encrypted processing result 319 is as shown in FIG. 25. Finally, the TEE trusted part processing unit 304 returns the encrypted processing result 319 to the processing query execution unit 303, and ends the TEE internal data processing.

Figure 31:
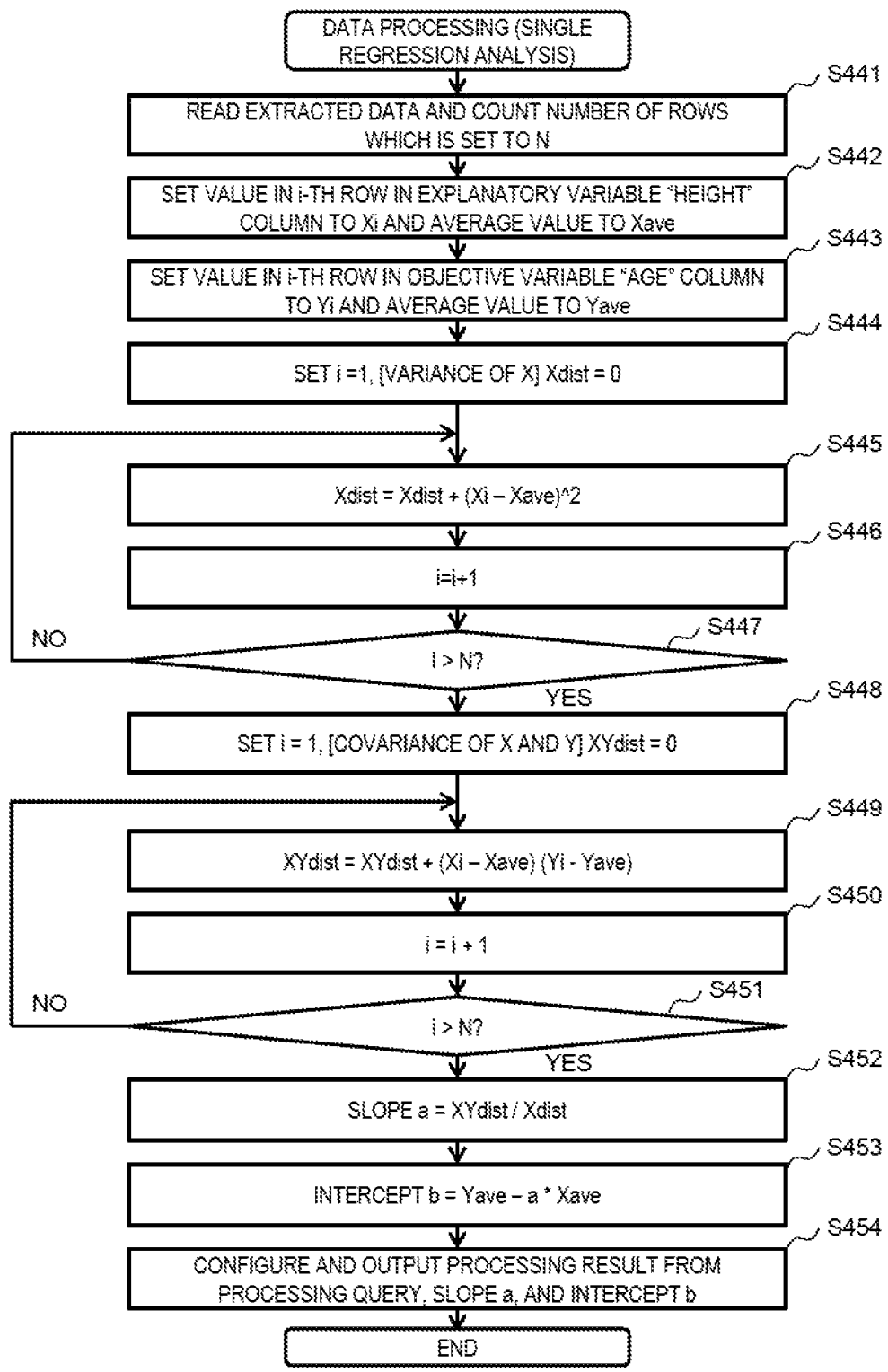
FIG. 31 is a flowchart showing a processing process of data processing.

FIG. 31 is a flowchart showing a processing process of the data processing. FIG. 31 shows a processing process in a case where single regression analysis is used as a specific processing process example of the data processing in Step S434 of FIG. 29. As described above in the explanation of FIG. 29, in the data processing, the processing query in plaintext obtained in Step S432 (a query similar to the processing query 213 shown in FIG. 20) and the extracted data 337 in plaintext obtained in Step S433 (see FIG. 30) are input.

According to FIG. 31, first, the TEE trusted part processing unit 304 counts the number of records of the extracted data 337 between the extracted data 337 in plaintext and the processing query in plaintext that are input, and substitutes the number into a variable N (Step S441).

Next, the TEE trusted part processing unit 304 refers to a value of an i-th row of a "height" column described as the explanatory variable X in the processing query with a variable "Xi", and also sets an average value of all records of the "height" column to "Rave" (Step S442). Then, the TEE trusted part processing unit 304 refers to a value of an i-th row of an "age" column described as the objective variable Y in the processing query with a variable "Yi", and also sets an average value of all records of the "age" column to "Yave" (Step S443). As described above, the processing query of the present example is similar to the processing query 213 shown in FIG. 20.

Next, the TEE trusted part processing unit 304 sets an initial value of a variable i to 1 and sets an initial value of a variable "Xdist" indicating a calculation result of a variance of the "height" column to 0 (Step S444).

Next, the TEE trusted part processing unit 304 calculates "Xdist+(Xi−Xave)^2" and substitutes a calculation result as a new value of "Xdist" (Step S445). Note that an expression "( )^2" indicates a square value of a value in "( )". Then, the TEE trusted part processing unit 304 increments a value of the variable i by 1 (Step S446).

Next, the TEE trusted part processing unit 304 compares a value of the variable i and a value of the variable N (the number of records of the extracted data 337), and, in a case where "i≤N", the processing of Steps S445 and S446 is repeated, and in a case where "i>N", the processing proceeds to processing of Step S448 (Step S447). That is, while the variable i is increased by 1, the processing of Steps S445 to S447 is repeated as many times as the number of records of the extracted data 337, and when the processing ends, the processing proceeds to Step S448.

When the processing proceeds to Step S448, the TEE trusted part processing unit 304 initializes the variable i to 1 and sets an initial value of a variable "XYdist" indicating a calculation result of a covariance of the "height" column and the "age" column to 0.

Next, the TEE trusted part processing unit 304 calculates "XYdist+(Xi−Xave)*(Yi−Yave)" and substitutes a calculation result as a new value of "XYdist" (Step S449). Then, the TEE trusted part processing unit 304 increments a value of the variable i by 1 (Step S450).

Next, the TEE trusted part processing unit 304 compares a value of the variable i and a value of the variable N (the number of records of the extracted data 337), and, in a case where "i≤N", the processing of Steps S449 and S450 is repeated, and in a case where "i>N", the processing proceeds to processing of Step S452 (Step S451). That is, while the variable i is increased by 1, the processing of Steps S449 to S451 is repeated as many times as the number of records of the extracted data 337, and when the processing ends, the processing proceeds to Step S452.

In Step S452, the TEE trusted part processing unit 304 substitutes a calculation result of "XYdist÷Xdist" into a variable a representing a "slope" in single regression analysis (Step S452). Further, the TEE trusted part processing unit 304 substitutes a calculation result of "Yave−a*Xave" into a variable b representing an "intercept" in single regression analysis (Step S453).

Finally, the TEE trusted part processing unit 304 forms and outputs the processing result 338 in plaintext from the processing query, the slope "a", and the intercept "b" (Step S454), and ends the data processing. A specific data example of the processing result 338 is as shown in FIG. 24.

(3) Conclusion

As described above, according to the confidential information processing system 1 according to the present embodiment, in processing of encrypted data including various pieces of data, decryption is performed in a trusted part (TEE trusted part 38) in which a limited amount of data that can be handled, after data extraction by a confidential search query that can perform search or order comparison while data is encrypted is performed to narrow processing target data without transmitting the encrypted data to a user device. Accordingly, a transmission overhead of encrypted data can be eliminated, and a response time for a processing result to the user can be shortened by efficiently using a limited trusted part.

Further, according to the confidential information processing system 1 according to the present embodiment, as described in Steps S410 to S414 in FIG. 18, in a case where a data amount of extracted processing target data exceeds a data amount that can be handled in a trusted part (the TEE trusted part 38), the processing target data is divided to be processed, and then processing results are put together (aggregated). Accordingly, even in a case where a data amount of processing target data is large, advanced statistical processing and analysis processing such as machine learning using a trusted part can be executed.

Further, according to the confidential information processing system 1 according to the present embodiment, a processing request of a processing result user is handled while being encrypted by a processing key in a place other than the inside of a trusted part in a server of a confidential information processing company (the confidential information processing server 30). Accordingly, processing content of a processing result user can be made confidential against a server administrator of the confidential information processing server 30 and a cyber attacker.

From the above, a confidential information processing company that provides a confidential information processing service by the confidential information processing system 1 performs plaintext processing only in a trusted part of a TEE function in which information cannot be read even if the administrator authority of a server is taken over on the server (the confidential information processing server 30). Accordingly, a service of outputting an analysis processing result of advanced statistical analysis, machine learning, and the like while confidential information such as personal information and processing content of a processing result user are kept confidential against a server administrator and a cyber attacker can be provided.

Note that the present invention is not limited to the above-described embodiment, and includes various variations and equivalent configurations within the scope of the appended claims. For example, the above embodiments are described in detail for easy understanding of the present invention, and the present invention is not necessarily limited to one that includes all the described configurations. Further, for part of a configuration of an embodiment, other configurations may be added, deleted, or replaced with.

Further, each of the above-described configurations, functions, processing units, processing means, and the like may be realized by hardware, for example, by designing part or all of them with an integrated circuit, and may be realized by software by a processor interpreting and executing a program that realizes each function.

Information, such as a program that performs each function, a table, and a file, can be stored in storage devices, such as a memory, a hard disk, and a solid state drive (SSD), or recording media, such as an IC card, an SD card, and a DVD.

Further, the drawings show a control line and an information line that are considered necessary for explanation, and do not show all control lines or information lines necessary for implementation. In practice, almost all configurations can be considered to be connected mutually.

Further, the present invention can obtain a similar effect even in a case where confidential information that is highly confidential and restricted from being disclosed to the outside of a company due to an internal rule and the like, such as a business secret, in addition to personal information.

Further, the present invention can be widely applied to an information processing system for public and private sector services that link various pieces of confidential information, since personal information and business secret information can be analyzed by advanced statistical processing and machine learning while the information is kept confidential in a plurality of organizations that handle confidential information, such as personal information such as customer information and medical information and a business secret.

Although the present disclosure has been described with reference to example embodiments, those skilled in the art will recognize that various changes and modifications may be made in form and detail without departing from the spirit and scope of the claimed subject matter.

What is claimed is:

1. A confidential information processing system that performs data processing on encrypted data of data including confidential information provided to a confidential information processing server from a data holder terminal which owns the data, wherein
the confidential information processing server comprises:
a processing request execution unit that receives a processing request for the encrypted data including an extraction request and a data processing request;
a confidential extraction processing unit that instructs execution of confidential extraction for extracting data that matches with a predetermined condition while the encrypted data is kept encrypted;
a trusted part processing unit that decrypts and processes the encrypted data using an encryption key that can be used only in a safe trusted part in a trusted execution environment (TEE); and
an encrypted data holding unit that stores the encrypted data encrypted with a confidentially extractable cipher with which the confidential extraction can be executed, and
when the processing request execution unit receives the processing request,
the trusted part processing unit generates a confidential extraction query for performing extraction of data that matches with a condition of a processing target in the processing request by the confidential extraction based on the processing request and the encryption key,
the confidential extraction processing unit extracts encrypted data of the processing target while the data is kept encrypted from the encrypted data holding unit by instructing execution of the generated confidential extraction query,
the trusted part processing unit decrypts encrypted data of the processing target extracted by the confidential extraction processing unit with the encryption key, and executes data processing requested by the processing request, and the processing request execution unit returns an execution result of the data processing to a transmission source of the processing request,
wherein the confidentially extractable cipher includes a searchable cipher that enables match determination while the data is kept encrypted,
wherein the processing request execution unit divides encrypted data of the processing target extracted by the confidential extraction processing unit into divided data that does not exceed a data amount that can be handled in the trusted part, and transmits the divided data to the trusted part processing unit, and
wherein the trusted part processing unit decrypts each piece of the divided data with the encryption key, executes data processing requested by the processing request, and puts together execution results to obtain an execution result of the data processing.

2. The confidential information processing system according to claim 1, wherein
the confidentially extractable cipher includes an order comparable encryption that enables large and small comparison determination while data is kept encrypted.

3. The confidential information processing system according to claim 1, wherein
the data holder terminal encrypts a data key used for encryption of the encrypted data by using a public key provided by the trusted part processing unit and registers the encrypted data in the confidential information processing server, and
when the encrypted data is registered in the confidential information processing server from the data holder terminal, the trusted part processing unit decrypts using the decrypted registration processing key the encrypted data by using the registered data key that is encrypted with the public key, and then encrypts the data by using the encryption key that can be used only in the trusted part to the confidentially extractable cipher and stores the data in the encrypted data holding unit.

4. The confidential information processing system according to claim 1, further comprising a user terminal that transmits the processing request to the confidential information processing server, wherein
the user terminal encrypts a processing key used for encryption of the processing request by using a public key provided by the trusted part processing unit and registers the processing key in the confidential information processing server, and encrypts the processing request by using the processing key and transmits the processing request to the processing request execution unit.

5. The confidential information processing system according to claim 4, wherein
the trusted part processing unit decrypts using the decrypted registration processing key the encrypted processing request received by the processing request execution unit from the user terminal by using the registered processing key that is encrypted with the public key, and then encrypts the processing request to the confidentially extractable cipher by using the encryption key that can be used only in the trusted part, so as to generate the confidential extraction query.

6. The confidential information processing system according to claim 1, wherein
data processing required by the processing request is single regression analysis.

7. The confidential information processing system according to claim 1, wherein the confidential extraction query includes a SQL statement and a confidential extraction determination function for determining a condition of the encrypted data while the data is kept encrypted.

8. A confidential information processing method that performs data processing on encrypted data of data including confidential information provided to a confidential information processing server from a data holder terminal which owns the data, the confidential information processing server including:
- a processing request execution unit that receives a processing request for the encrypted data;
- a confidential extraction processing unit that instructs execution of confidential extraction for extracting data that matches with a predetermined condition while the encrypted data is kept encrypted;
- a trusted part processing unit that decrypts and processes the encrypted data using an encryption key that can be used only in a safe trusted part in a trusted execution environment (TEE); and
- an encrypted data holding unit that stores the encrypted data encrypted with a confidentially extractable cipher with which the confidential extraction can be executed, the confidential information processing method comprising:
- a processing request receiving step in which the processing request execution unit receives the processing request;
- a confidential extraction query generating step in which the trusted part processing unit generates a confidential extraction query for performing extraction of data that matches with a condition of a processing target in the processing request by the confidential extraction based on the processing request and the encryption key received in the processing request receiving step;
- a confidential data extracting step in which the confidential extraction processing unit extracts encrypted data of the processing target while the data is kept encrypted from the encrypted data holding unit by instructing execution of the confidential extraction query generated in the confidential extraction query generating step;
- a trusted part internal data processing step in which the trusted part processing unit decrypts encrypted data of the processing target extracted in the confidential data extracting step with the encryption key, and executes data processing requested by the processing request; and
- a processing request responding step in which the processing request execution unit returns an execution result of the trusted part internal data processing step to a transmission source of the processing request;

wherein the confidentially extractable cipher includes a searchable cipher that enables match determination while the data is kept encrypted;

wherein the processing request execution unit divides encrypted data of the processing target extracted by the confidential extraction processing unit into divided data that does not exceed a data amount that can be handled in the trusted part, and transmits the divided data to the trusted part processing unit; and wherein the trusted part processing unit decrypts each piece of the divided data with the encryption key, executes data processing requested by the processing request, and puts together execution results to obtain an execution result of the data processing.

* * * * *